US012724203B2

(12) United States Patent
Jarvenpaa et al.

(10) Patent No.: US 12,724,203 B2
(45) Date of Patent: Sep. 1, 2026

(54) OPTICAL APPARATUS COMPRISING A FIRST LIGHT WAVEGUIDE AND A SECOND LIGHT WAVEGUIDE EACH HAVING AN IN-COUPLING DIFFRACTION GRATING, MODULES, AND DEVICES

(71) Applicant: Nokia Technologies Oy, Espoo (FI)

(72) Inventors: Toni Johan Jarvenpaa, Akaa (FI); Marja Pauliina Salmimaa, Tampere (FI); Jyrki Sakari Kimmel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 281 days.

(21) Appl. No.: 18/293,432

(22) PCT Filed: Jul. 15, 2022

(86) PCT No.: PCT/EP2022/069895
§ 371 (c)(1),
(2) Date: Jan. 30, 2024

(87) PCT Pub. No.: WO2023/011888
PCT Pub. Date: Feb. 9, 2023

(65) Prior Publication Data

US 2024/0219643 A1 Jul. 4, 2024

(30) Foreign Application Priority Data

Aug. 2, 2021 (EP) .................................... 21189143

(51) Int. Cl.
*G02B 6/34* (2006.01)
*G02B 27/01* (2006.01)

(52) U.S. Cl.
CPC ........... *G02B 6/34* (2013.01); *G02B 27/0101* (2013.01)

(58) Field of Classification Search
None
See application file for complete search history.

(56) References Cited

U.S. PATENT DOCUMENTS

2010/0296163 A1* 11/2010 Saarikko ............. G02B 5/1814
359/569
2018/0275415 A1 9/2018 Schowengerdt et al.
(Continued)

FOREIGN PATENT DOCUMENTS

EP 2225592 A1 9/2010
EP 3245444 A1 11/2017
(Continued)

*Primary Examiner* — Paul C Lee
(74) *Attorney, Agent, or Firm* — McCarter & English, LLP

(57) ABSTRACT

An apparatus includes: a first light waveguide including at least: a first in-coupling diffraction grating to in-couple first input beams of light into the first light waveguide from a first light engine, a first expander to expand the first input beams of light from the first light engine to form first expanded beams of light, and a first out-coupling diffraction grating to out-couple the first expanded beams of light from the first light waveguide; a second light waveguide including at least: a second in-coupling diffraction grating to in-couple second input beams of light into the second light waveguide from a second light engine, a second expander to expand the second input beams of light from the second light engine to form second expanded beams of light, and a second out-coupling diffraction grating to out-couple the second expanded beams of light.

14 Claims, 27 Drawing Sheets

(56) References Cited

U.S. PATENT DOCUMENTS

| | | | | |
|---|---|---|---|---|
| 2020/0103657 | A1* | 4/2020 | Kimmel | G02B 5/1842 |
| 2020/0144109 | A1* | 5/2020 | Meyer Timmerman Thijssen | G02B 5/1819 |

FOREIGN PATENT DOCUMENTS

| | | | |
|---|---|---|---|
| EP | 3343267 | A1 | 7/2018 |
| WO | WO 2004/109349 | A2 | 12/2004 |

* cited by examiner

OPTICAL APPARATUS COMPRISING A FIRST LIGHT WAVEGUIDE AND A SECOND LIGHT WAVEGUIDE EACH HAVING AN IN-COUPLING DIFFRACTION GRATING, MODULES, AND DEVICES

CROSS REFERENCE TO RELATED APPLICATION

This patent application is a U.S. National Stage application of International Patent Application Number PCT/EP2022/069895 filed Jul. 15, 2022, which is hereby incorporated by reference in its entirety, and claims priority to EP 21189143.7 filed Aug. 2, 2021.

TECHNOLOGICAL FIELD

Examples of the disclosure relate to optical apparatus, modules and devices. Some relate to optical apparatus, modules and devices for head-up displays.

BACKGROUND

Head-up displays can be provided in vehicles, including aircraft and automobiles. Head-up displays can be provided by concave mirrors and projectors or other means to project images onto a transparent surface viewable by a user.

BRIEF SUMMARY

According to various, but not necessarily all, embodiments there is provided an apparatus comprising:

- first light guiding means comprising at least: first in-coupling diffractive means configured to in-couple one or more first input beams of light into the first light guiding means from a first light engine, first expanding means configured to expand the one or more first input beams of light from the first light engine to form one or more first expanded beams of light, and first out-coupling diffractive means configured to out-couple the one or more first expanded beams of light from the first light guiding means;
- second light guiding means comprising at least: second in-coupling diffractive means configured to in-couple one or more second input beams of light into the second light guiding means from a second light engine, second expanding means configured to expand the one or more second input beams of light from the second light engine to form one or more second expanded beams of light, and second out-coupling diffractive means configured to out-couple the one or more second expanded beams of light from the second light guiding means;
- wherein the first out-coupling diffractive means and the second out-coupling diffractive means are positioned to form a combined and continuous out-coupling projected area which is greater in size than either of the individual projected areas of the first out-coupling diffractive means and the second out-coupling diffractive means.

According to various, but not necessarily all, embodiments there is provided a Head-Up-Display device comprising the apparatus of the preceding paragraph.

The following portion of this 'Brief Summary' section, describes various features that may be features of any of the embodiments described in the foregoing portion of the 'Brief Summary' section. The description of a function should additionally be considered to also disclose any means suitable for performing that function.

In some, but not necessarily all, examples, the first out-coupling diffractive means and the second out-coupling diffractive means are positioned so that an edge of the first out-coupling diffractive means is aligned with an edge of the second out-coupling diffractive means to form the combined and continuous out-coupling projected area.

In some, but not necessarily all, examples, the first light guiding means is configured to provide a first image, the second light guiding means is configured to provide a second image, wherein the first image and second image comprise the same image content, wherein the first light guiding means and the second light guiding means form a combined exit pupil, wherein in at least a part of the combined exit pupil the image viewed is a combination of a portion of the first image and a portion of the second image, wherein the portion of the first image and the portion of the second image that combine to form the viewed image vary depending on the viewing position.

In some, but not necessarily all, examples, the first out-coupling diffractive means and the second out-coupling diffractive means are positioned so that a portion of the first out-coupling diffractive means is superposed over a portion of the second out-coupling diffractive means to form the combined and continuous out-coupling projected area.

In some, but not necessarily all, examples, the first light guiding means is configured to provide a first image, the second light guiding means is configured to provide a second image, wherein the first light guiding means and the second light guiding means form a combined field-of-view exit pupil, wherein in the combined field-of-view exit pupil, the image viewed is a third image, wherein the third image is a combination of the first image and the second image, wherein the third image has a larger field-of-view than the field-of-view of first image or the field-of-view of the second image.

In some, but not necessarily all, examples, the first image and the second image comprise different image content.

In some, but not necessarily all, examples, the first light guiding means and the second light guiding means are arranged so that in the combined field-of-view exit pupil a portion of the first image and a portion of the second image overlap and align, wherein the portion of the first image and the portion of the second image that overlap and align vary across the combined field-of-view exit pupil.

In some, but not necessarily all, examples, the portion of the first image and the portion of the second image are identical image content portions.

In some, but not necessarily all, examples, the portion of the third image where the portion of the first image and the portion of the second image overlap and align is brighter than the rest of the third image.

In some, but not necessarily all, examples, the center of the field-of-view of the first image is not perpendicular to the first outcoupling diffractive means, and wherein the center of the field-of-view of the second image is not perpendicular to the second outcoupling diffractive means.

In some, but not necessarily all, examples, the first out-coupling diffractive means comprises a first part and a second part wherein the first out-coupling diffractive means and the second out-coupling diffractive means are positioned so that an edge of the first part is aligned with a first edge of the second out-coupling diffractive means, and an edge of the second part is aligned with a second edge of the second out-coupling diffractive means, to form the combined and continuous out-coupling projected area.

In some, but not necessarily all, examples, the first light guiding means comprises a first substrate, wherein the first substrate comprises the first in-coupling diffractive means, the first expanding means, first out-coupling diffractive means, wherein the second light guiding means comprises a second substrate, wherein the second substrate comprises the second in-coupling diffractive means, the second expanding means, second out-coupling diffractive means.

In some, but not necessarily all, examples, the first substrate and the second substrate are stacked.

In some, but not necessarily all, examples, the first out-coupling diffractive means comprises first diffraction gratings, wherein the second out-coupling diffractive means comprises second diffraction gratings, wherein the first diffraction gratings are angled away from the edge of the first outcoupling diffractive means by a first angle, wherein the second diffraction gratings of the second out-coupling diffractive means are angled away from the edge of the second out-coupling diffractive means by a second angle, wherein the first angle and second angle are the same and are acute.

According to various, but not necessarily all, embodiments there is provided examples as claimed in the appended claims. The scope of protection sought for various embodiments of the invention is set out by the independent claims. The examples and features, if any, described in this specification that do not fall under the scope of the independent claims are to be interpreted as examples useful for understanding various embodiments of the invention.

BRIEF DESCRIPTION

Some examples will now be described with reference to the accompanying drawings in which.

Figure 1:
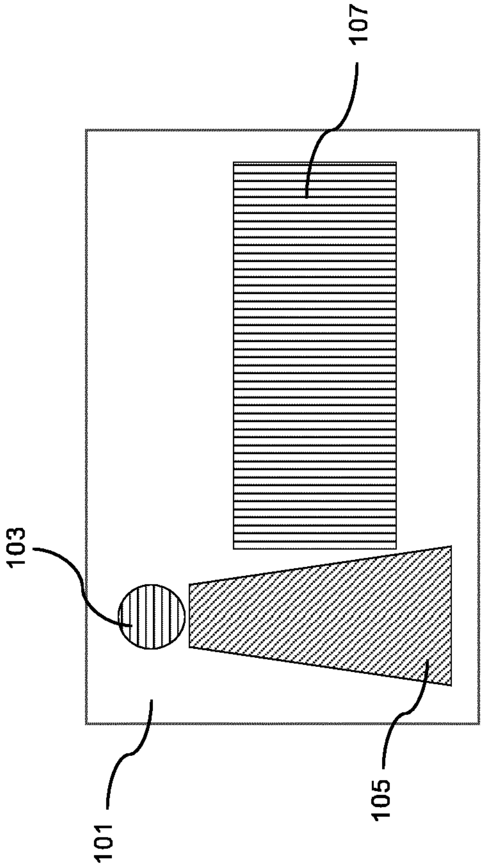
FIG. 1 shows an example light guiding means.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

FIG. 1 shows an example light guiding means 101 that can be used in examples of the disclosure. The light guiding means 101 can be formed on a waveguide, an optical substrate, a transparent plate or any other suitable material or composite material.

In this example the light guiding means 101 comprises an exit pupil expander. The exit pupil expander is configured to increase the size of an exit pupil from a light engine or other optical arrangement. The light engine could be a display means such as a projection engine.

The light guiding means 101 comprises in-coupling diffractive means 103, expanding means 105, and out-coupling diffractive means 107.

The in-coupling diffractive means 103 comprise any means that is configured to in-couple one or more beams of light from a light engine into the light guiding means 101. The in-coupling diffractive means 103 is positioned within the light guiding means 101 so that, in use, the in-coupling diffractive means 103 can be positioned adjacent to the light engine.

The one or more in-coupled beams of light travel though the light guiding means 101 via total internal reflection. The refractive index of the material that is used for the light guiding means 101, the wavelength of the one or more in-coupled beams, and the parameters of the in-coupling diffractive means 103 determine the total internal reflection angles.

The expanding means 105 is positioned within the light guiding means 101 so that the one or more in-coupled beams of light are provided from the in-coupling diffractive means 103 to the expanding means 105.

The expanding means 105 comprise any means that is configured to expand the one or more in-coupled beams of light in at least one dimension. The expanding means 105 can comprise a diffractive means such as a diffraction grating or any other suitable means. In the diffraction grating an in-coupled beam of light is split into two with every internal reflection. The two split sections of the beam travel in different directions and continue splitting and so expand the exit pupil of the light engine. In the example shown in FIG. 1 the expanding means 105 has a grating which expands the beam in a vertical direction.

The out-coupling diffractive means 107 is positioned within the light guiding means 101 so that the one or more vertically expanded beams of light are provided from the expanding means 105 to the out-coupling diffractive means 107.

The out-coupling diffractive means 107 comprises any means that is configured to out-couple the one or more vertically expanded light beams out of the light guiding means 101. The out-coupling diffractive means 107 can function in a similar manner to the expanding means 105 so that an expanded beam of light is split into two with every internal reflection. The out-coupling diffractive means 107 can also be configured to expand the vertically expanded beam of light in a second dimension. In the example shown in FIG. 1 the out-coupling diffractive means 107 has a vertical grating which expands the vertical expanded beam in the horizontal direction.

The light guiding means 101 is configured so that the one or more out-coupled expanded beams of light can be viewed by a user. The one or more out-coupled expanded beams of light provide a virtual image that can be observed by a user. The one or more out-coupled beams of light therefore provide an expanded exit pupil.

It is to be appreciated that the variations in the size, shape, position, and expansion direction of the different diffractive means are examples and that other variations could be used in other examples of the disclosure. For example, the expanding means 105 could expand the light beam in some other direction than vertical. As another example, the diffractive out-coupling means 107 could expand the beam in some other direction than horizontal. As a third example, the exit pupil of the one or more beams of light in-coupled by the in-coupling means 103 would be expanded in the first expansion dimension already prior to in-coupling the one or more beams into the light guiding means 101. In this example there would be no expanding means 105 positioned within the light guiding means 101.

The diffractive means that are used for the in-coupling diffractive means 103, expanding means 105, and out-coupling diffractive means 107 can comprise any means that can be configured to diffract the input beams of light. The diffractive means can comprise any one or more of a diffractive optical element, diffractive structure, diffraction gratings, holographic gratings, Bragg gratings, rulings, ridges, surface relief diffractive gratings or any suitable optical component or feature having a periodic structure that splits and diffracts light into several beams travelling in different directions.

Figure 2A:
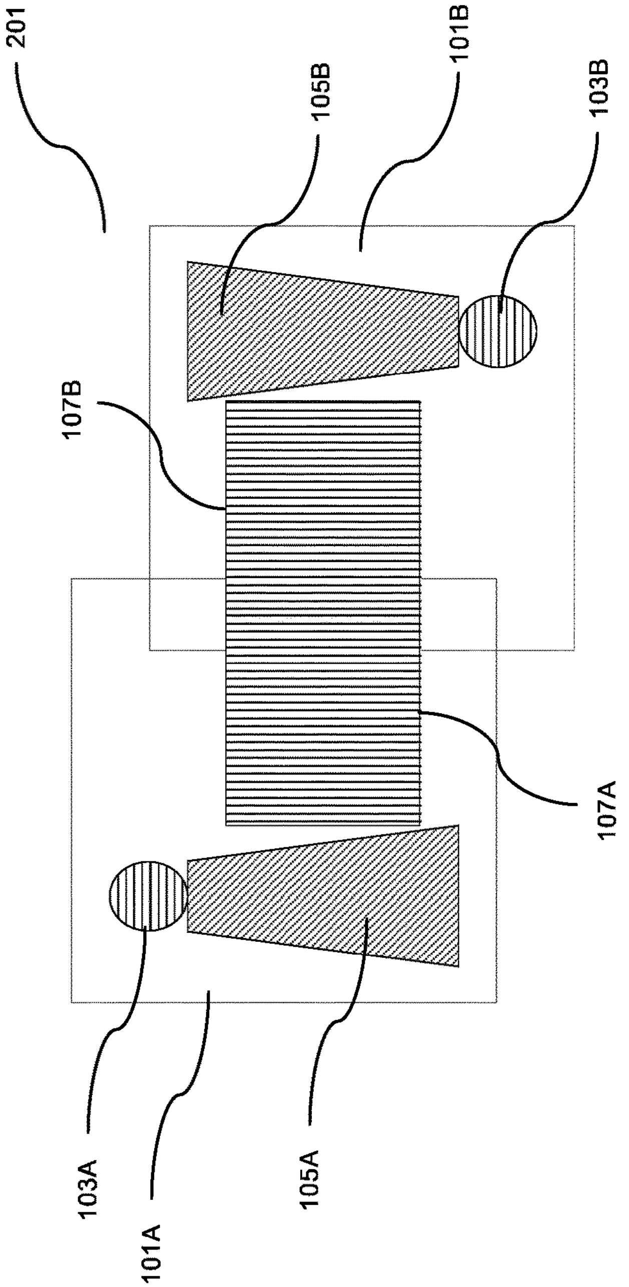
FIG. 2A, 2B, 2C, 2D, 2E, 2F show an example apparatus.

FIG. 2A shows an example apparatus 201 in plan view. In some examples the apparatus 201 could be used in a head-up display device or module. The head-up display device or module could be used in vehicles, such as aircraft or automobiles, or any other suitable apparatus.

The example apparatus 201 shown in FIG. 2A comprises a first light guiding means 101A and a second light guiding means 101B. The first light guiding means 101A and the second light guiding means 101B can comprise an exit pupil expander as shown in FIG. 1 and as described above. Corresponding reference numerals are used for corresponding features. The first light guiding means 101A comprises first in-coupling diffractive means 103A configured to in-couple one or more first input beams of light into the first light guiding means 101A from a first light engine, first expanding means 105A configured to expand the one or more first input beams of light from the first light engine to form one or more first expanded beams of light, and first out-coupling diffractive means 107A configured to out-couple the one or more first expanded beams of light from the first light guiding means 101A.

The second light guiding means 101B comprises second in-coupling diffractive means 103B configured to in-couple one or more second input beams of light into the second light guiding means 101B from a second light engine, second expanding means 105B configured to expand the one or more second input beams of light from the second light engine to form one or more second expanded beams of light, and second out-coupling diffractive means 107B configured to out-couple the one or more second expanded beams of light from the second light guiding means 101B.

The first out-coupling diffractive means 107A and the second out-coupling diffractive means 107B are positioned to form a combined and continuous out-coupling projected area which is greater in size than either of the individual projected areas of the first out-coupling diffractive means 107A and the second out-coupling diffractive means 107B.

Figure 2B:
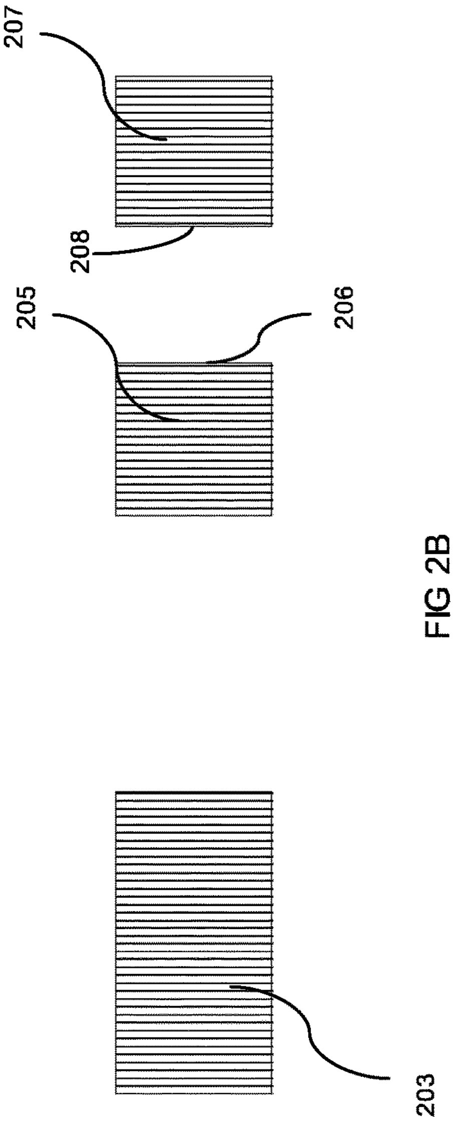

FIG. 2B illustrates the combined continuous out-coupling projected area 203 which is greater in size than the individual projected areas 205, 207 of the first out-coupling diffractive means 107A and the second out-coupling diffractive means 107B respectively.

A projected area is the two-dimensional area measurement of a three-dimensional object by projecting its shape onto an arbitrary plane. The first out-coupling diffractive means 107A and the second out-coupling diffractive means 107B are positioned such that their projected areas are combined and is a continuous total area. In this example the combined area is a continuous out-coupling area as there are no gaps or discontinuities in the area that out-couples light beams.

The first out-coupling diffractive means 107A and the second out-coupling diffractive means 107B of the apparatus 201 are positioned so that an edge 206 of the first out-coupling diffractive means 107A is aligned with an edge 208 of the second out-coupling diffractive means 107B to form the combined and continuous out-coupling projected area 203.

Figure 2C:
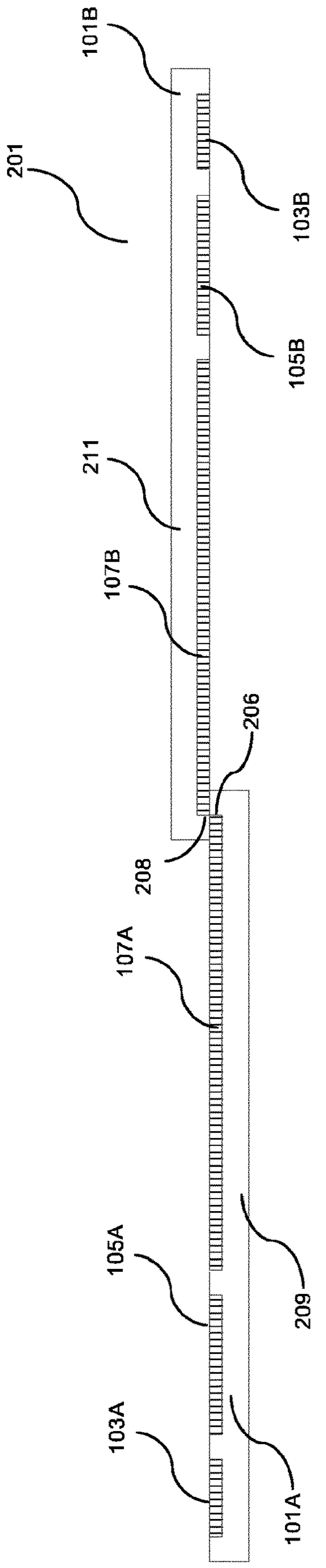

FIG. 2C illustrates the apparatus 201 in a side view. In this example the first light guiding means 101A comprises a first substrate 209. The first substrate 209 comprises the first in-coupling diffractive means 103A, the first expanding means 105A and the first out-coupling diffractive means 107A. The second light guiding means 101B comprises a second substrate 211, wherein the second substrate 211 comprises the second in-coupling diffractive means 103B, the second expanding means 105B and the second out-coupling diffractive means 107B.

The first substrate 209 and the second substrate 211 of the apparatus 201 are stacked. Stacking the first substrate 209 and the second substrate 211 enables the edge 206 and edge 208 to be aligned.

Figure 2D:
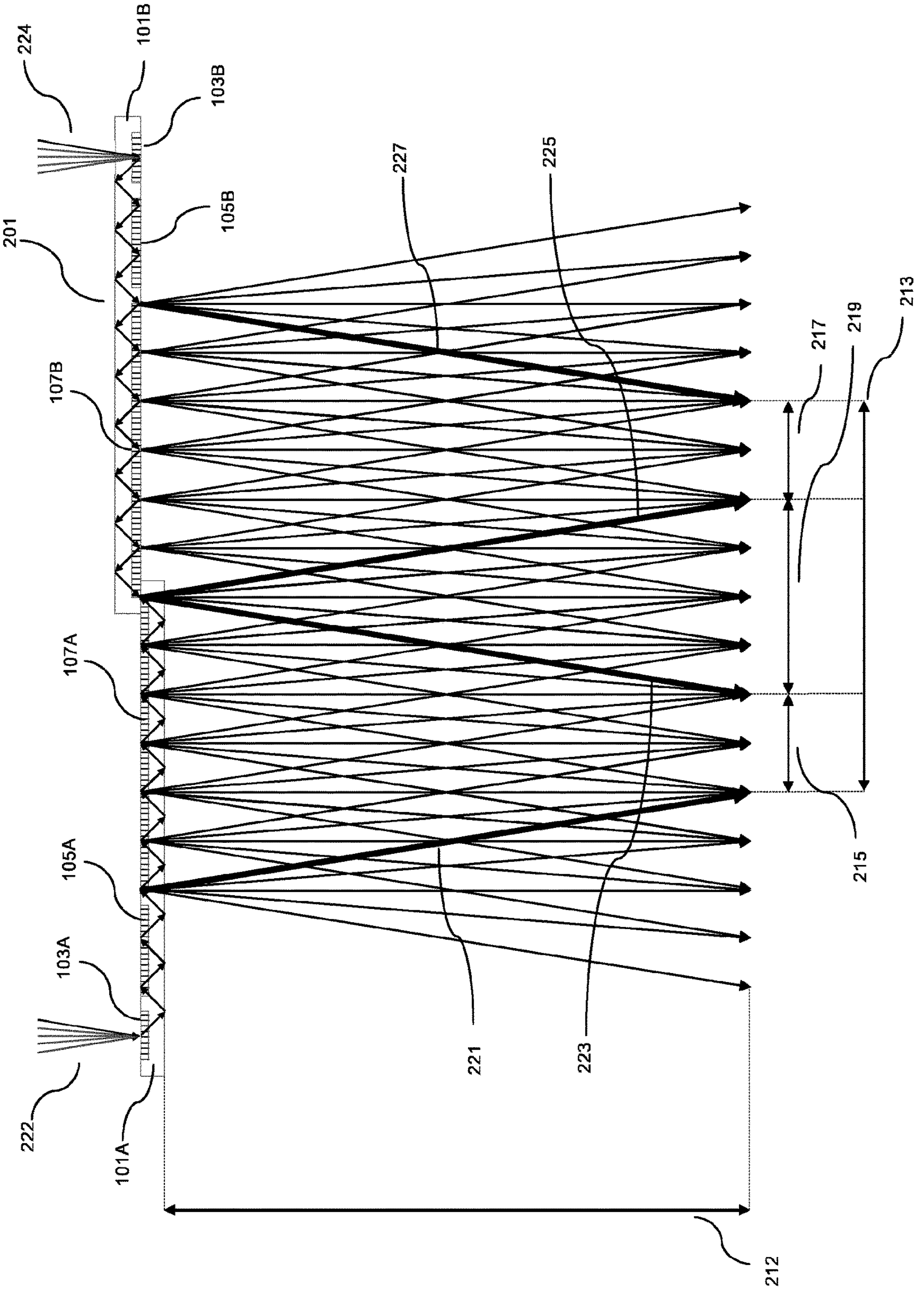

FIG. 2D illustrates the example apparatus 201 with example light paths of the beams of light. In this example the first light guiding means 101A is configured to provide a first image and the second light guiding means 101B is configured to provide a second image. In this example the first image and the second image comprise the same image content. The first light guiding means 101A and the second light guiding means 101B form a combined exit pupil, illustrated by arrow 213.

The combined exit pupil illustrated in FIG. 2D is the combined exit pupil formed at the distance from the first light guiding means 101A illustrated by arrow 212. The distance from the first light guiding means 101A to the combined exit pupil can be referred to as the eye relief distance.

In at least a part of the combined exit pupil the image viewed is a combination of a portion of the first image and a portion of the second image. The portion of the first image and the portion of the second image that combine to form the viewed image vary depending on the viewing position. In the example of FIG. 2D, the part of the combined exit pupil in which the image viewed is a combination of a portion of the first image and a portion of the second image is the third region (illustrated by arrow 219), as described below.

In a first region of the combined exit pupil (illustrated by arrow 215), the image viewed is the first image. In a second region of the combined exit pupil (illustrated by arrow 217), the image viewed is the second image. In a third region of the combined exit pupil (illustrated by arrow 219), the image viewed is a combination of a portion of the first image and a portion of the second image. The portion of the first image and the portion of the second image that combine to form the viewed image vary across the third region.

In FIG. 2D, the lines 221, 223, 225 and 227 illustrate light paths at the boundaries between the different regions of the combined exit pupil and the size of the combined exit pupil.

Light paths 222, 224 represent the input one or more beams of the light from the first light engine and the second light engine respectively. The first image and the second image originate from the first light engine and the second light engine respectively. FIG. 2D also illustrates the internal reflection of light beams within the first light guiding means 101A and the second light guiding means 101B.

At eye relief distances which are further than that shown in FIG. 2D by arrow 212, the size of the third region will increase, and at some eye relief distances, there will be no first region or second region. At these eye relief distances, in the entire combined exit pupil the image viewed is a combination of a portion of the first image and a portion of the second image. The entire combined exit pupil can be referred to as being formed of the third region at these eye relief distances.

Figure 2E:
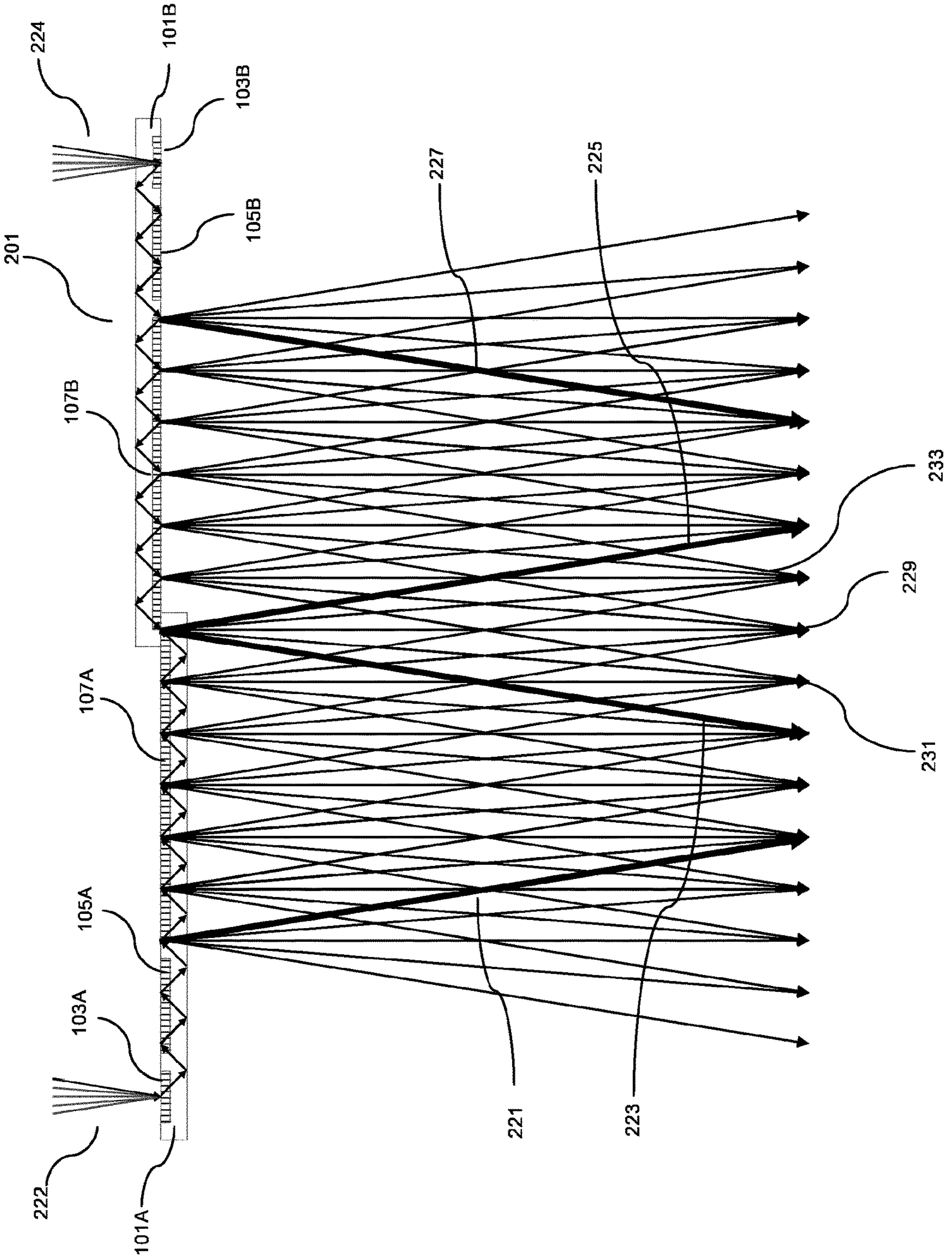

FIG. 2E is the same as FIG. 2D but does not show the arrows 212, 213, 215, 217 and 219 for clarity.

As illustrated in FIG. 2D and FIG. 2E, the light paths that form the third region vary across the third region. For example, the converging light paths 229 form a combined image with equal amounts of light paths from the first light guiding means 101A and the second light guiding means 101B. The converging light paths 231 are formed of more light paths from the first light guiding means 101A compared to the second light guiding means 101B. The converging light paths 233 comprise a greater number of light paths from the second light guiding means 101B compared to light paths from the first light guiding means 101A.

This enables a combined exit pupil to be provided for viewing the image which is larger than the exit pupil of either first light guiding means 101A and the second light guiding means 101B on their own. The apparatus 201 can also be provided instead of another apparatus which has a light guiding means with a larger out-coupling diffractive means which would provide the same size of exit pupil. Light guiding means with larger out-coupling diffractive means can be more difficult to manufacture and more costly.

Figure 2F:
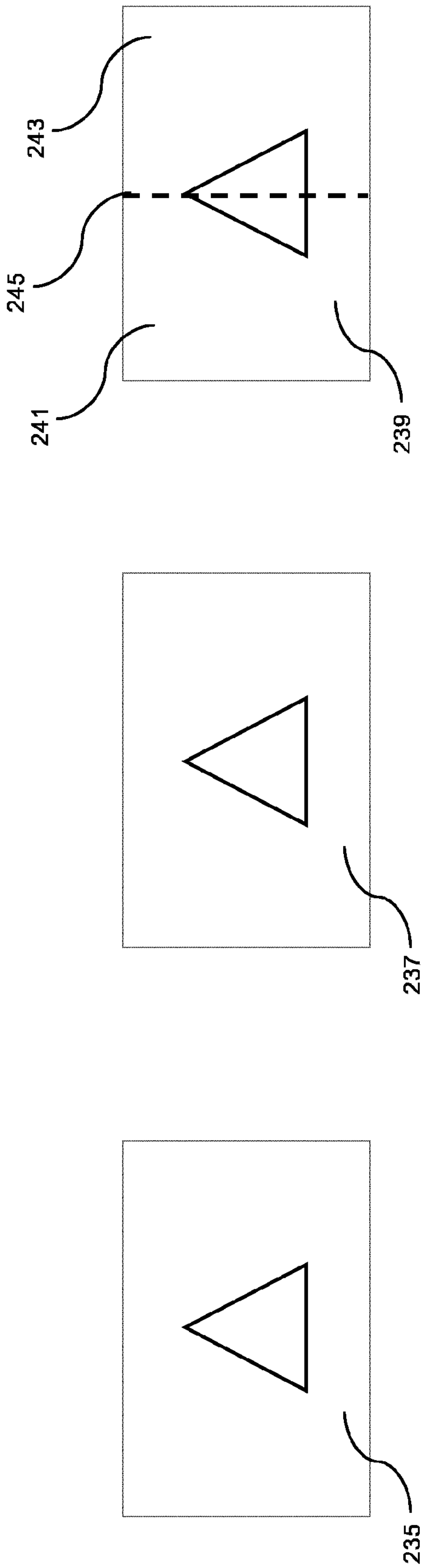

FIG. 2F illustrates an example first image 235, an example second image 237 and an example third image 239. As shown in FIG. 2F, first image 235 and second image 237 comprise the same image content and are viewed in the first region and the second region of the combined exit pupil respectively. The third image 239 shown in FIG. 2F is an example of the image viewed in at least a part of the combined exit pupil in which the image viewed is a combination of a portion of the first image and a portion of the second image. This can be viewed in the third region of the combined exit pupil, and it is an example of an image viewed when the entire combined exit pupil provides an image which is a combination of a portion of the first image and a portion of the second image.

In this example the third image 239 is a representation of the image viewed due to the converging light paths 229. In this example the portion 241 of the first image and the portion 243 of the second image are the left half and the right half of the first image and second image respectively. Therefore, the third image viewed will at least approximate or be substantially identical to either of the first image or the second image. There could be minor differences in the third image compared to the first image or the second image around the point at which the first image and second image combine, represented by the dashed line 245 which is not actually present in the image. In some examples, there is no visible difference between the third image and each of the first and second images.

Aligning the edges 206, 208 can provide a third image which is substantially identical to the first image and the second image. Aligning the first out-coupling diffractive means 107A and the second out-coupling diffractive means 107B avoids aligning the first light guiding means 101A and the second light guiding means 101B using the edges of the first substrate 209 and second substrate 211, which may lead to misalignment of the first out-coupling diffractive means 107A and the second out-coupling diffractive means 107B due to variation in manufacture of the first substrate 209 and the second substrate 211.

Figure 3B:
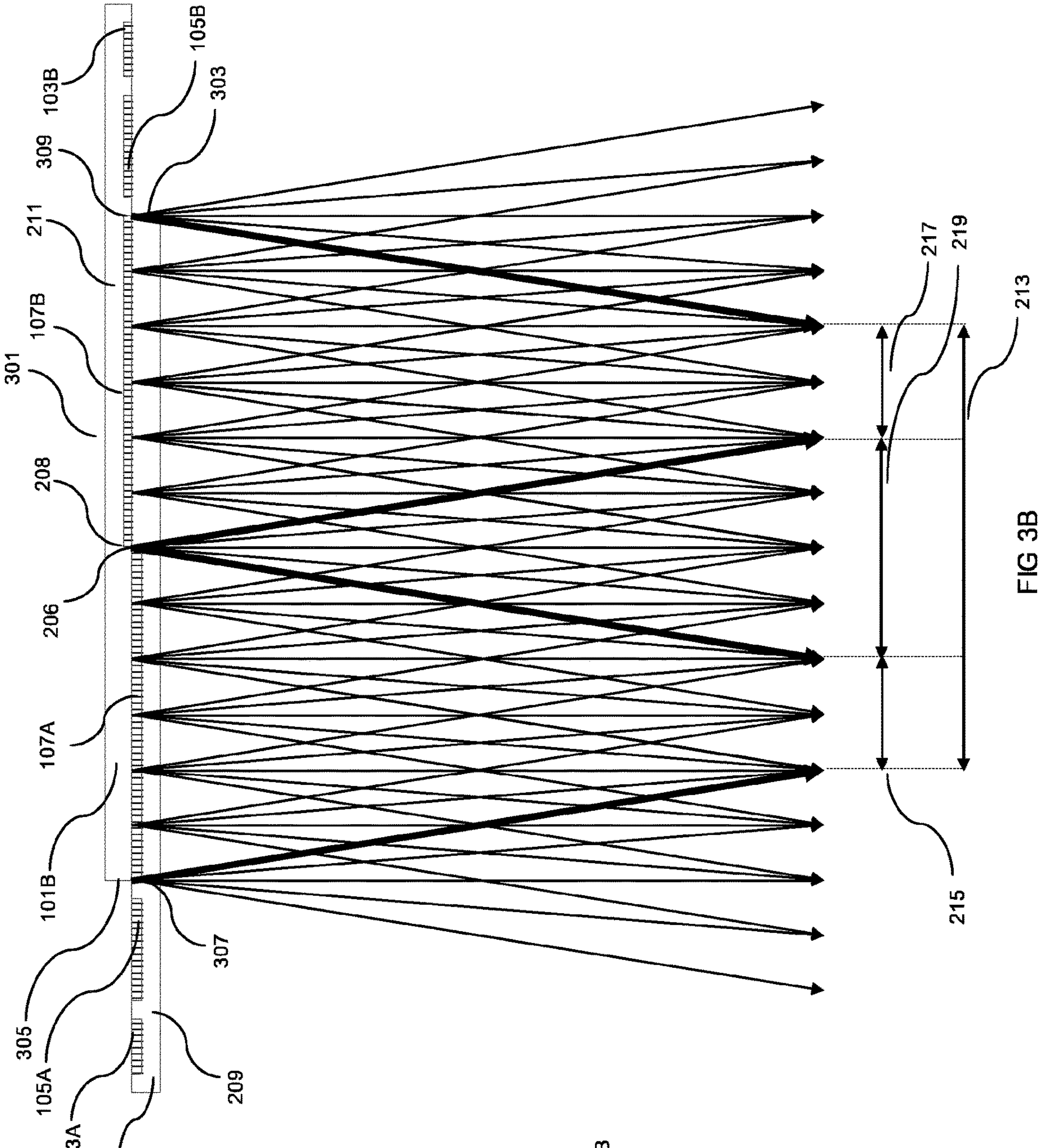
FIG. 3A, 3B show an example apparatus.
Figure 3A:
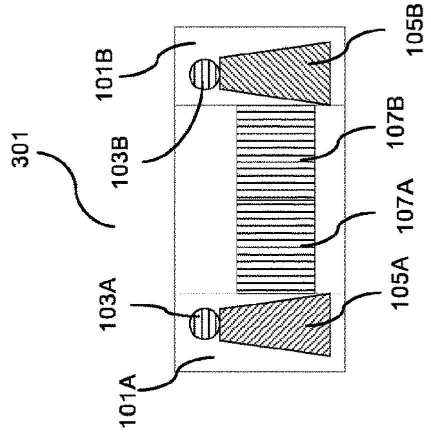

FIG. 3A illustrates an example apparatus 301 in plan view. Apparatus 301 comprises a first light guiding means 101A and a second light guiding means 101B, with components as described previously. For clarity the light paths from the first light engine and the second light engine, and the internal reflection of light beams within the first light guiding means 101A and the second light guiding means 101B are not shown in FIG. 3A and other Figs.

As illustrated in FIG. 3A, the first out-coupling diffractive means 107A and the second out-coupling diffractive means 107B are positioned to form a combined and continuous out-coupling projected area which is greater in size than either of the individual projected areas of the first out-coupling diffractive means 107A and the second out-coupling diffractive means 107B.

FIG. 3B illustrates a side view of apparatus 301. As illustrated in FIG. 3B, the first light guiding means 101A comprises a first substrate 209 and a second light guiding means 101B comprises a second substrate 211. In this example the first substrate 209 and the second substrate 211 are stacked. This enables the alignment of edges 206 and 208 to form the combined and continuous out-coupling projected area as described previously. As illustrated in FIG. 3B, the first substrate 209 and the second substrate 211 of apparatus 301 are longer substrates than the first substrate 209 and the second substrate 211 of apparatus 201. The first substrate 209 has an end 303 and the second substrate has an end 305. In the example of FIG. 3B, the lengths of the first substrate 209 and the second substrate 211 are provided such that the end 303 of the first substrate 209 is aligned with a second edge 309 of the second out-coupling diffractive means 107B, and the end 305 of the second substrate 211 is aligned with a second edge 307 of the first out-coupling diffractive means 107A. In this example, second edge 309 is opposite edge 208, and second edge 307 is opposite edge 206.

This can aid avoiding visible artefacts due to the substrate edges either being visible for the viewer, or blocking light travelling through the substrate(s), or both. This can also aid aligning the first light guiding means 101A and the second light guiding means 101B as there are more references for alignment.

The portion of the first substrate 209 which underlies the second out-coupling diffractive means 107B is optically transparent to the light being out-coupled from the second out-coupling diffractive means 107B. As described for the apparatus 201, in the example apparatus 301 the first light guiding means 101A is configured to provide a first image, the second light guiding means 101B is configured to provide a second image. The first image and the second image comprise the same image content. The first light guiding means 101A and the second light guiding means 101B form a combined exit pupil, represented by arrow 213.

The combined exit pupil illustrated in FIG. 3B is the combined exit pupil formed at a particular eye relief distance from the first light guiding means 101A.

In at least a part of the combined exit pupil the image viewed is a combination of a portion of the first image and a portion of the second image. The portion of the first image and the portion of the second image that combine to form the viewed image vary depending on the viewing position. In the example of FIG. 3B, the part of the combined exit pupil in which the image viewed is a combination of a portion of the first image and a portion of the second image is the third region (illustrated by arrow 219), as described below.

In a first region (illustrated by arrow 215) of the combined exit pupil the image viewed is the first image. In a second region (illustrated by arrow 217) of the combined exit pupil the image viewed is the second image. In a third region (illustrated by arrow 219) of the combined exit pupil the image viewed is a combination of a portion of the first image and a portion of the second image. The portion of the first image and the portion of the second image that combine to form the third image vary across the third region.

At eye relief distances which are further than that shown in FIG. 3B, the size of the third region will increase, and at some eye relief distances, there will be no first region or second region. At these eye relief distances, in the entire combined exit pupil the image viewed is a combination of a portion of the first image and a portion of the second image.

Figure 4A:
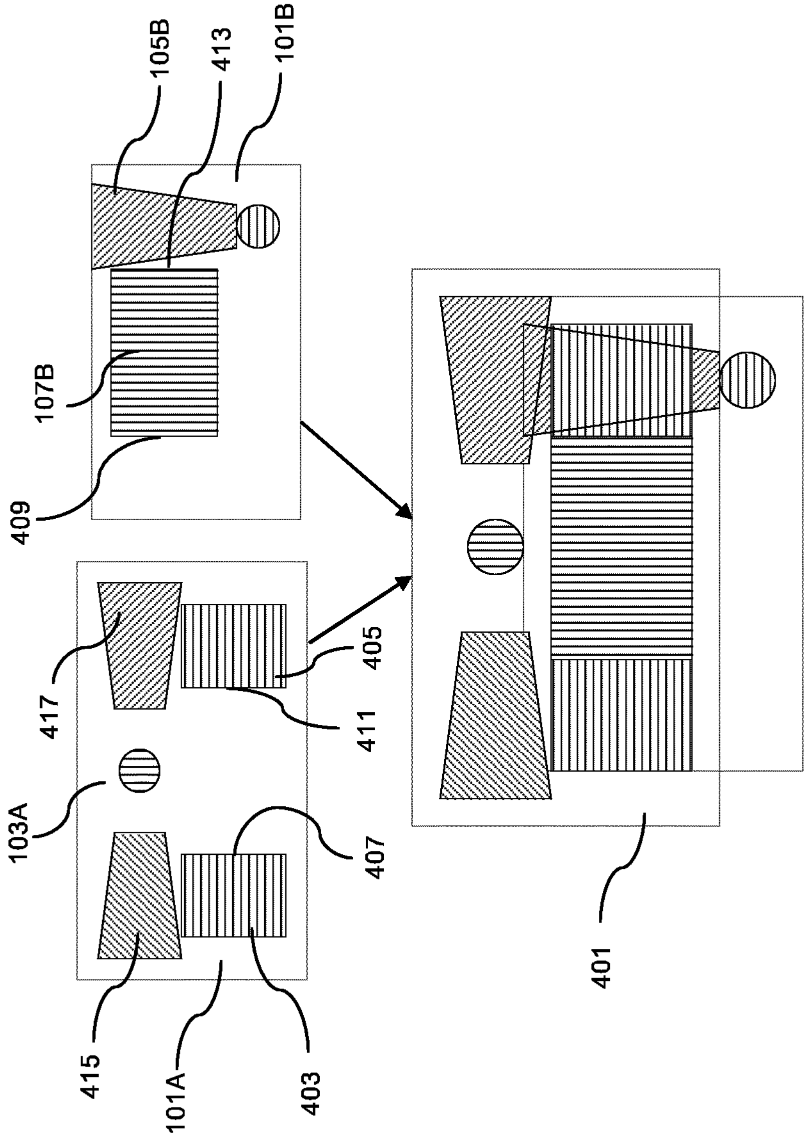
FIG. 4A, 4B show an example apparatus.

FIG. 4A illustrates an example apparatus 401, an example first light guiding means 101A and an example second light guiding means 101B in plan view. The apparatus 401 comprises a first light guiding means 101A and a second light guiding means 101B. In this example the first out-coupling diffractive means 107A comprises a first part 403 and a second part 405. The first out-coupling diffractive means 107A and the second out-coupling diffractive means 107B are positioned so that an edge 407 of the first part 403 is aligned with a first edge 409 of the second out-coupling diffractive means 107B. An edge 411 of the second part 405 is aligned with a second edge 413 of the second out-coupling diffractive means 107B. The alignment of the edges 407, 411 of the first part 403 and the second part 405 with the edges 409, 413 of the second out-coupling diffractive means 107B forms the combined and continuous out-coupling projected area.

In this example the first expanding means 105A comprises a first part 415 and a second part 417. In this example the first in-coupling diffractive means 103A is configured to in-couple light from the first light engine into the first part 415 and the second part 417 of the first expanding means 105A concurrently. In some examples the first in-coupling diffractive means 103A is configured to in-couple half of the light from the first light engine into the first part 415 and the second half of the light from the first light engine into the second part 417. In other examples the proportion of light from the first light engine going to each of the first part 415 and the second part 417 can be different.

In some examples, the first in-coupling diffractive means 103A comprises binary gratings. Binary gratings can equally split the light into the first part 415 and the second part 417, and are easier to manufacture for large exit pupil expanders than for example blazed or slanted gratings.

Figure 4B:
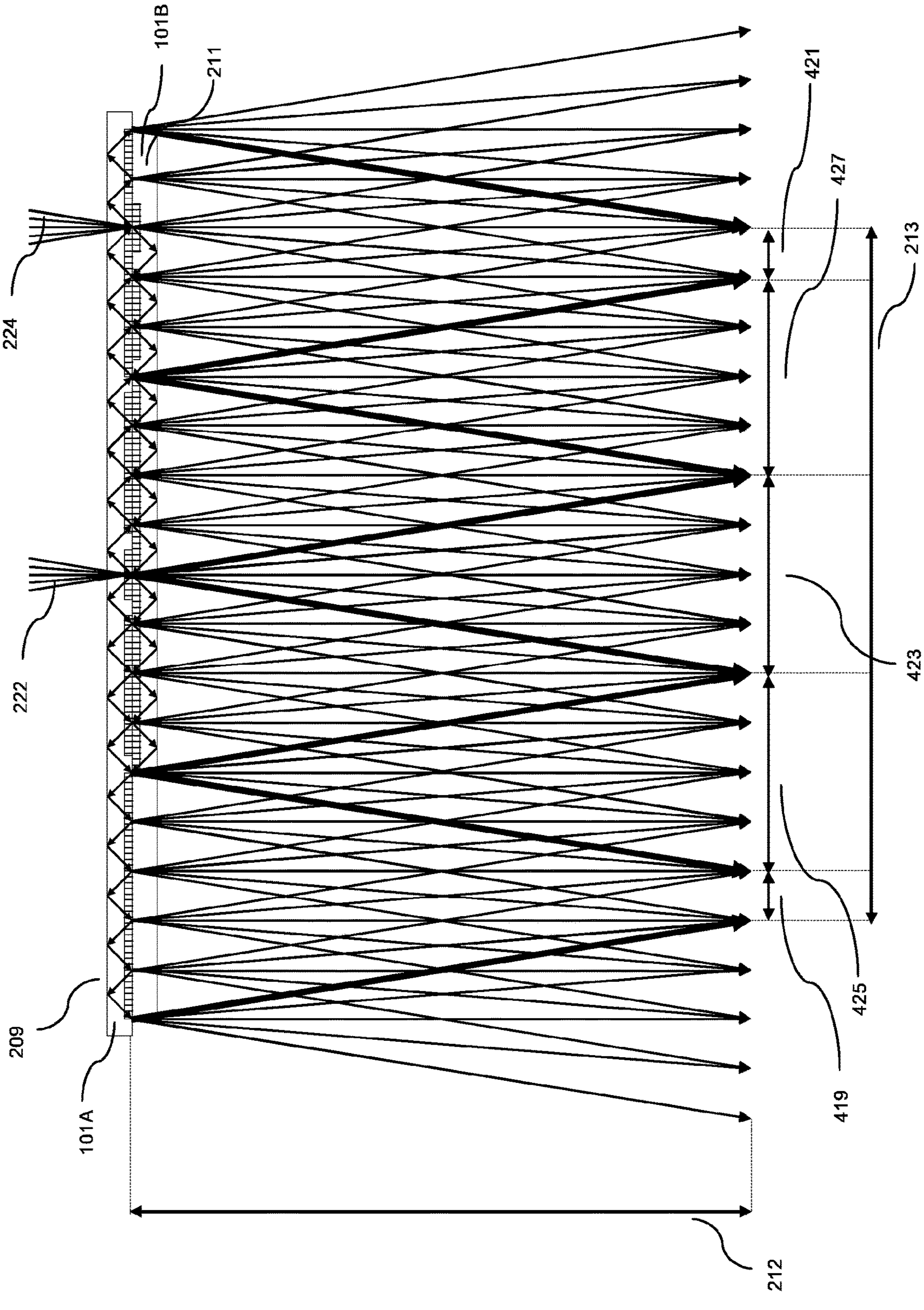

FIG. 4B illustrates the apparatus 401 from a side view. In this example apparatus 401 comprises a first substrate 209 and a second substrate 211.

In this example the first light guiding means 101A is configured to provide a first image, the second light guiding means 101B is configured to provide a second image. The first image and the second image comprise the same image content. The first light guiding means 101A and the second light guiding means 101B form a combined exit pupil.

The combined exit pupil illustrated in FIG. 4B is the combined exit pupil formed at the eye relief distance from the first light guiding means 101A represented by arrow 212. The distance represented by arrow 212 in FIG. 4B is not necessarily the same distance shown by arrow 212 in other Figures.

In at least a part of the combined exit pupil the image viewed is a combination of a portion of the first image and a portion of the second image. The portion of the first image and the portion of the second image that combine to form the viewed image vary depending on the viewing position. In the example of FIG. 4B, the parts of the combined exit pupil in which the image viewed is a combination of a portion of the first image and a portion of the second image is the fourth region and the fifth region (illustrated by arrows 425, 427 respectively), as described below.

In a first region (illustrated by arrow 419) and a second region (illustrated by arrow 421), the image viewed is the first image. In a third region (illustrated by arrow 423) the image viewed is the second image. In a fourth region (illustrated by arrow 425) and a fifth region (illustrated by arrow 427) the image viewed is a combination of a portion of the first image and a portion of the second image. The portion of the first image and the portion of the second image that combine to form the viewed image vary across the fourth region and the fifth region.

At some eye relief distances, the first region, second region and third region do not exist. The image viewed across the entire combined exit pupil at these eye relief distances would be a combination of a portion of the first image, and a portion of the second image.

In apparatus 401 and other example apparatus, the substrates 209, 211 and the expanding means 105, diffractive out-coupling means 107 are at least partially optically transparent to out-coupled beams of light.

Figure 5B:
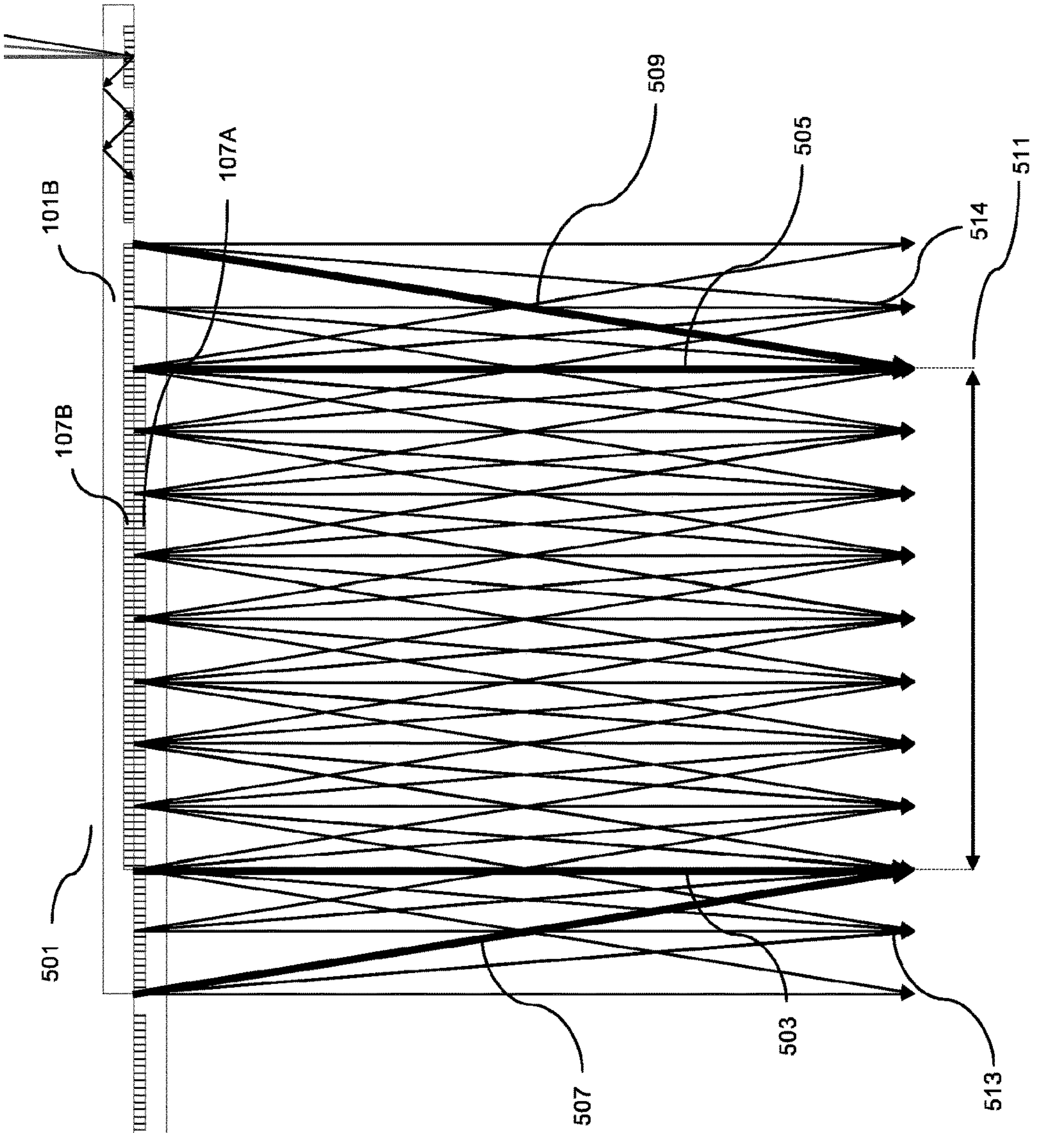
FIG. 5A, 5B, 5C show an example apparatus.
Figure 5A:
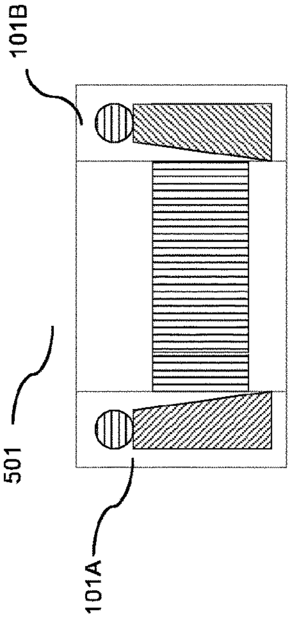

FIG. 5A illustrates an example apparatus 501 in plan view. The apparatus 501 comprises first light guiding means 101A and second light guiding means 101B with components as previously described. FIG. 5B illustrates the apparatus 501 from a side view. As shown in FIG. 5A and FIG. 5B, the first out-coupling diffractive means 107A and the second out-coupling diffractive means 107B are positioned so that a portion of the first out-coupling diffractive means 107A is superposed over a portion of the second out-coupling diffractive means 107B. This forms a combined and continuous out-coupling projected area.

In the example of FIG. 5A and FIG. 5B, the first light guiding means 107A is configured to provide a first image, the second light guiding means 107B is configured to provide a second image. The first light guiding means 107A and the second light guiding means 107B form a combined field-of-view exit pupil, represented by arrow 511. The combined field-of-view exit pupil illustrated in FIG. 5B is the combined field-of-view exit pupil formed at a particular eye relief distance from the first light guiding means 101A. The eye relief distance in FIG. 5B is not necessarily the same distance shown in other Figures. In the combined field-of-view exit pupil, the image viewed is a third image. The third image is a combination of the first image and the second image. The third image has a larger field-of-view than the field-of-view of the first image or the field-of-view of the second image.

In this example the width of the combined field-of-view exit pupil is constant for a range of eye relief distances. For eye relief distances further away from the first light guiding means 101A than the maximum end of the range, the combined field-of-view will crop and/or vignette. The boundaries of the combined field-of-view exit pupil for the range of eye relief distances are illustrated by light paths 503, 505. The light paths from the furthest ends of the first out-coupling diffractive means 107A and the second out-coupling diffractive means 107B that are present in the combined field-of-view exit pupil illustrated in FIG. 5B are illustrated by light paths 507, 509. The width of the exit pupil for the range of eye relief distances is represented by arrow 511.

In this example the size of the overlap between the first out-coupling diffractive means 107A and the second out-coupling diffractive means 107B defines the size of the combined field-of-view exit pupil for the range of eye relief distances.

In this example the center of the field-of-view of the first image is not perpendicular to the first out-coupling diffractive means 107A and the center of the field-of-view of the second image is not perpendicular to the second out-coupling diffractive means 107B. The center of a field-of-view not being perpendicular to the out-coupling diffractive means is hereafter referred to as a tilted field-of-view.

The tilted field-of-view of each image is controlled by the angle of tilt of the field-of-view of light from the light engine entering the in-coupling diffractive means. The geometric properties of the expanding means are altered to match the field-of-view and tilt angle of the in-coupled light so that the outcoupled light has the same angle of tilt in its field-of-view as the in-coupled light. For example, it can be seen that the shape of the expanding means 105A, 105B in FIG. 5A have a different shape compared to the expanding means 105A, 105B in the previous examples.

In this example the field-of-view of the first image and the second image are tilted by an equal and opposite amount so that the center of the field-of-view of the third image is perpendicular to the first out-coupling diffractive means 107A and the second out-coupling diffractive means 107B.

Figure 5C:
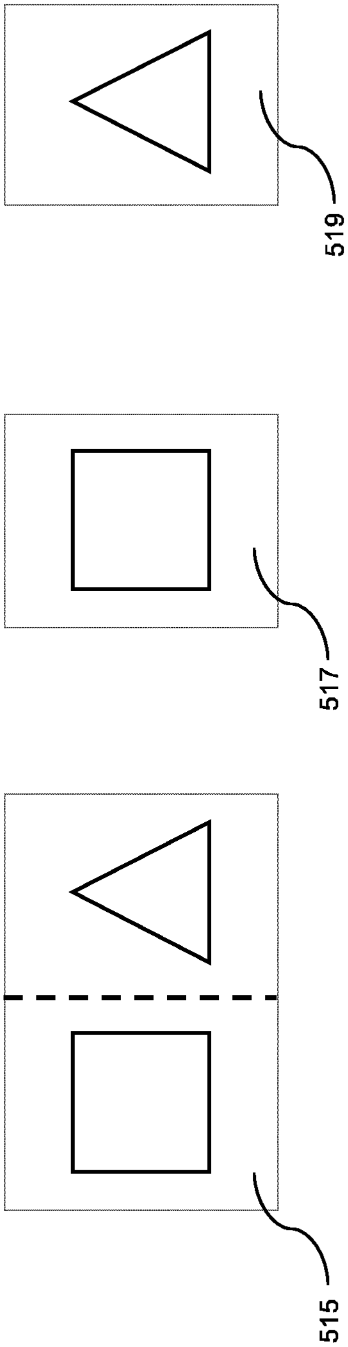

FIG. 5C illustrates an example third image 515, an example first image 517 and an example second image 519. The example third image 515 is an example image that is viewed within the combined field-of-view exit pupil. All the third images that are viewable within the combined field-of-view exit pupil are approximately the same or substantially identical. As illustrated in FIG. 5C, the third image 515 is a combination of the first image 517 and the second image 519. The first image 517 is viewable, for example at the location depicted by the converging light paths 513 and the second image 519 is, for example viewable at the position of the converging light paths 514. In this example, the first image 517 and the second image 519 comprise different image content. The dotted line in FIG. 5C is used for illustration purposes and does not appear in the third image 515.

Figure 6B:
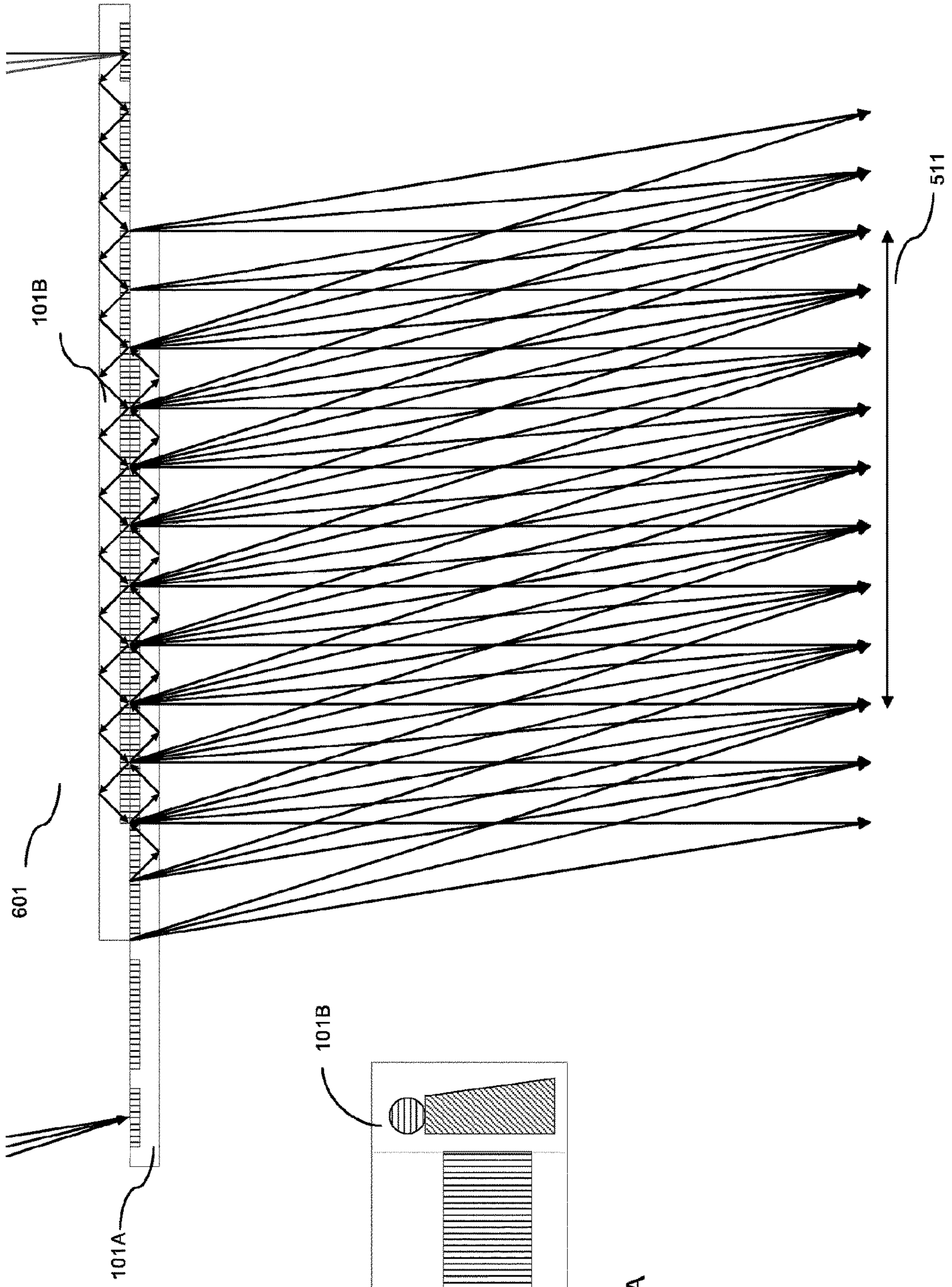
FIG. 6A, 6B show an example apparatus.
Figure 6A:
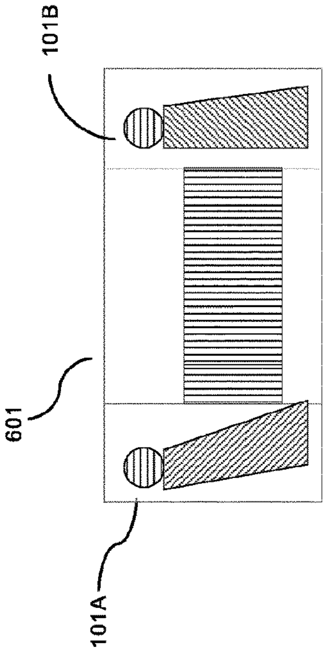

FIG. 6A and FIG. 6B illustrate an example apparatus 601. In this example the first out-coupling diffractive means 107A and the second out-coupling diffractive means 107B are positioned so that a portion of the first out-coupling diffractive means 107A is superposed over a portion of the second out-coupling diffractive means 107B to form a combined and continuous out-coupling projected area. As with the example apparatus 501, the first light guiding means 107A is configured to provide a first image, the second light guiding means is configured to provide a second image 107B. The first light guiding means 101A and the second light guiding means 101B form a combined field-of-view exit pupil, represented by arrow 511. In the combined field-of-view exit pupil the image viewed is a third image. The third image is a combination of the first image and the second image. The third image has a larger field-of-view than the field-of-view of the first image or the field-of-view of the second image. The third image viewed across different parts of the combined field-of-view exit pupil will be approximately the same or substantially identical.

In this example, both the field-of-view of the first image and the field-of-view of the second image have been tilted in the same direction so that the field-of-view of the combined field-of-view exit pupil is tilted with respect to the apparatus 601, so that the center of the field-of-view of the third image is not perpendicular to the apparatus 601. In this example the combined field-of-view exit pupil will have the same width for a range of eye relief distances. For eye relief distances further away from the first light guiding means 101A than the maximum end of the range, the combined field-of-view will crop and/or vignette.

Figure 7B:
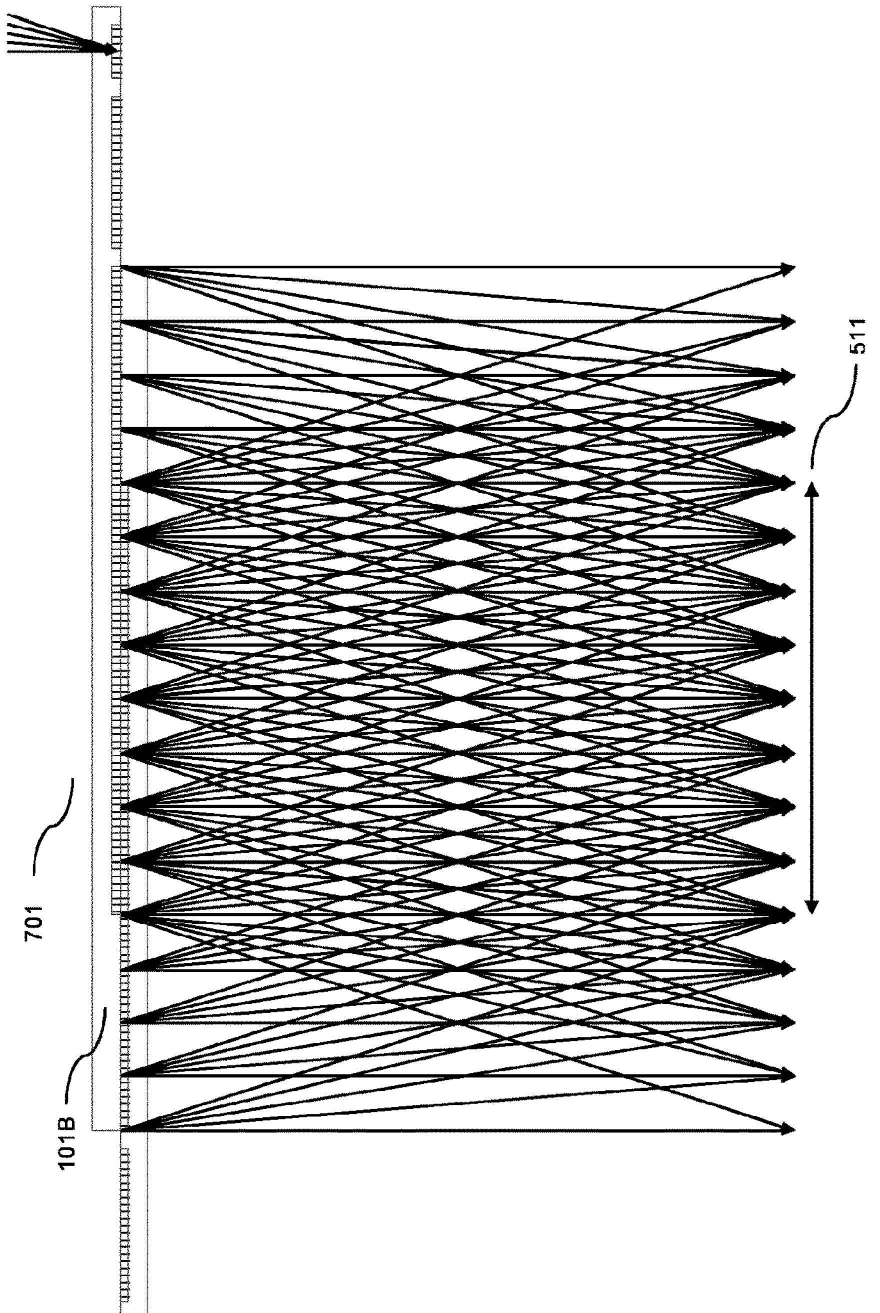
FIG. 7A, 7B show an example apparatus.
Figure 7A:
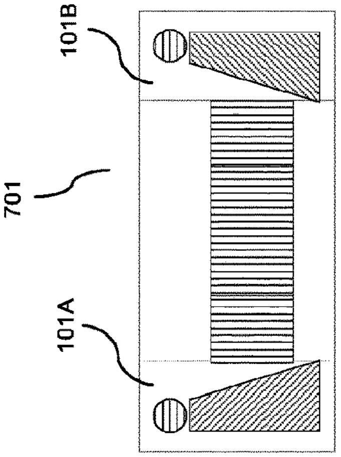

FIG. 7A and FIG. 7B illustrate an example apparatus 701. The apparatus 701 comprises a first light guiding means 101A and a second light guiding means 101B.

As with the apparatus 501, 601, the first light guiding means 101A of the apparatus 701 is configured to provide a first image, the second light guiding means 101B of the apparatus 701 is configured to provide a second image. The first light guiding means 101A and the second light guiding means 101B form a combined field-of-view exit pupil, represented by arrow 511. In the combined field-of-view exit pupil the image viewed is a third image. The third image is a combination of the first image and the second image. The third image has a larger field-of-view than the field-of-view of the first image or the field-of-view of the second image. The difference between the example apparatus 701 and the example apparatus 501 is that the field-of-view of the first image in the apparatus 701 is larger than the field-of-view of the first image in the apparatus 501, and correspondingly the field-of-view of the second image of the apparatus 701 is larger than the field-of-view of the second image in the apparatus 501.

This leads to a third image which has a larger field-of-view in the apparatus 701 than the field-of-view of the third image in the apparatus 501.

The field-of-view of the first image and the field-of-view of the second image is controlled by the field-of-view of light from the first light engine and the second light engine provided to the first and second in-coupling diffractive means 103A, 103B. It can also be adjusted by altering the properties of the first and second in-coupling light diffractive means 103A, 103B first and second expanding means 105A, 105B and first and second out-coupling diffractive means 107A, 107B.

Figure 8B:
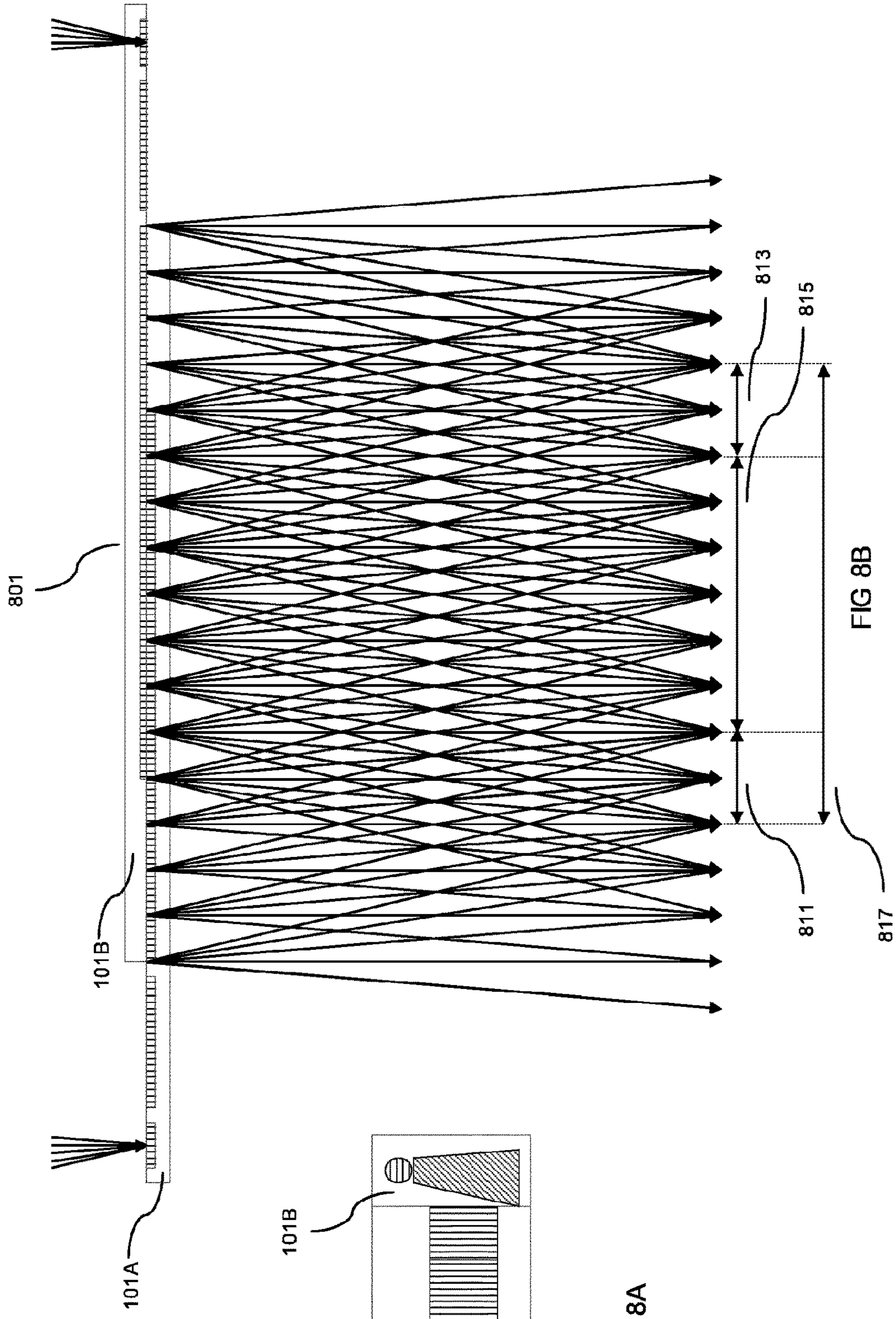
FIG. 8A, 8B, 8C show an example apparatus.
Figure 8A:
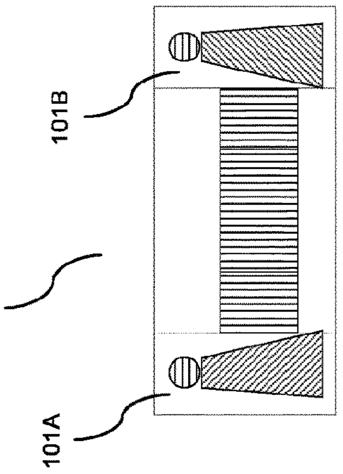

FIG. 8A and FIG. 8B illustrate an example apparatus 801. The apparatus 801 comprises a first light guiding means 101A and a second light guiding means 101B. In this example the first light guiding means 101A is configured to provide a first image, the second light guiding means 101B is configured to provide a second image. The first light guiding means 101A and the second light guiding means 101B form a combined field-of-view exit pupil, represented by arrow 817. In the combined field-of-view exit pupil the image viewed is a third image. The third image is a combination of the first image and the second image. The third image has a larger field-of-view than the field-of-view of the first image or the field-of-view of the second image.

In the example of FIG. 8A and FIG. 8B, the field-of-view of the first image and the field-of-view of the second image are tilted so that the field-of-view of the first image and the field-of-view of the second image overlap partially in the combined field-of-view exit pupil. In the example apparatus 501, 601, 701, the field-of-views of the first image and the second image do not overlap. The amount of overlap of the field-of-views of the first image and the second image are controlled by the amount of tilting of the field-of-view of the first image and the field-of-view of the second image. In this example the field-of-views of the first exit pupil and second exit pupil are tilted by opposite and equal amounts. Therefore, the field-of-view of the combined field-of-view exit pupil is not tilted with respect to the first out-coupling diffractive means 107A and the second out-coupling diffractive means 107B.

In the example apparatus 501, 601, 701, the first image and the second image can comprise different image content. In the example apparatus 801, the first image and the second image have portions which are identical image content portions.

If the light engines output equal brightness across the image light beams they each produce, then where the identical image content portions overlap and align, the light from the first image and the light from the second image constructively combine to form a brighter image in the area where the identical image content portions are combined and aligned. In some examples, the overlapping image content portions are not identical. In some examples, the overlapping image content portions comprise differently processed images which combine to form a combined image. The combined image has optimized uniformity. For example the first image can be processed to be shifted towards red wavelengths and the second image can be processed to be shifted towards blue wavelengths, so that the combined image is white. The overall efficiency/brightness can be increased as less compromises are needed in the first light guiding means 101A and the second light guiding means 101B design to achieve the uniform combined image (instead of optimizing each light guiding means separately to have uniform output).

Figure 8C:
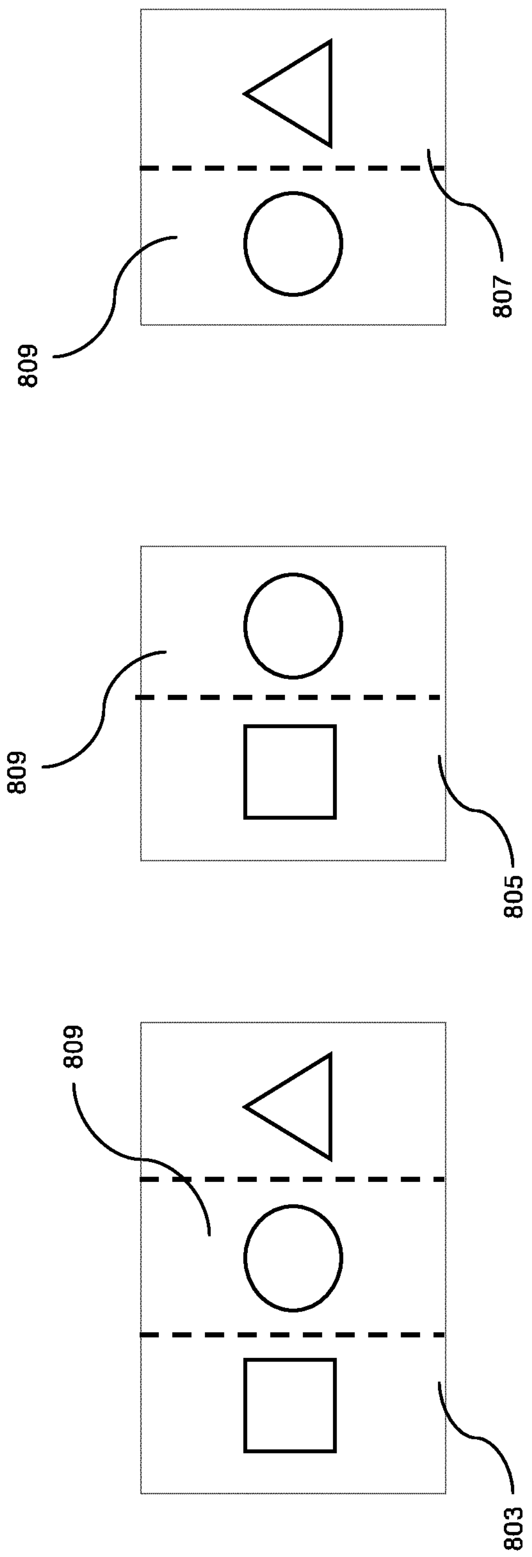

FIG. 8C illustrates an example third image 803, an example first image 805 and an example second image 807. As illustrated in FIG. 8C the image content portion 809 is provided in both the first image and the second image, and the two copies of the image content portion 809 in the first image 805 and the second image 807 overlap and are aligned in the third image 803. The example third image 803 illustrated in FIG. 8C is the image viewed in a third region (illustrated by arrow 815). When viewing a third image in either the first region (illustrated by arrow 811) or the second region (illustrated by arrow 813), only parts of the identical image content portions overlap and are aligned. For example in the first region, as the viewing position of the third image moves further to the left, the amount of the identical image content portion from the second image that is viewed decreases. For example in the second region, as the viewing position of the third image moves further to the right, the amount of the identical image content portion from the first image that is viewed decreases.

The combined field-of-view exit pupil illustrated in the example of FIG. 8A-8C is the combined field-of-view exit pupil at a particular eye relief distance from the first light guiding means 101A. The eye relief distance chosen can be to accommodate an expected viewing distance of a user. The properties of the first light guiding means 101A and the second light guiding means 101B can be selected accordingly so that the combined field-of-view exit pupil is provided with the properties described in the example of FIG. 8A-8C at the selected eye relief distance.

Figure 9B:
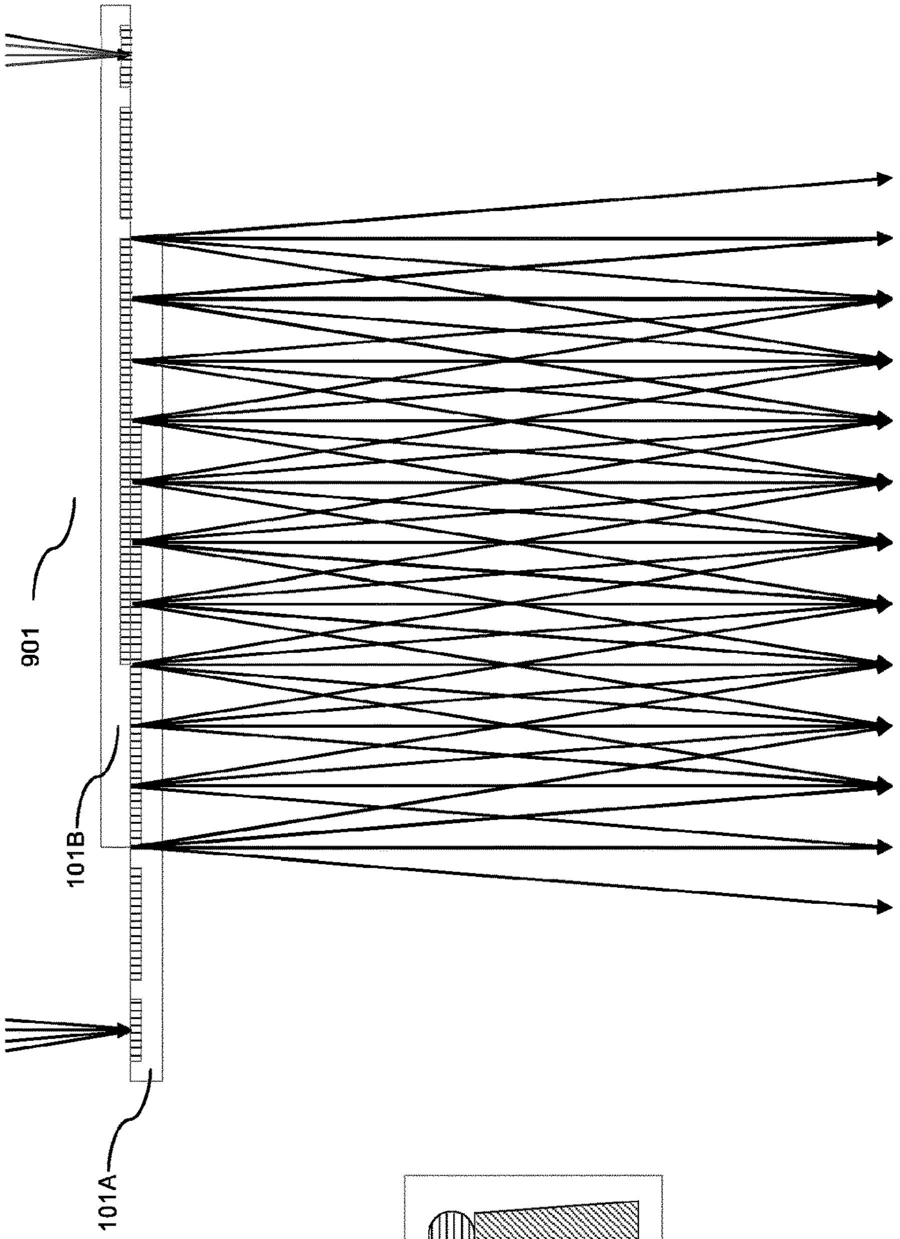
FIG. 9A, 9B, show an example apparatus.
Figure 9A:
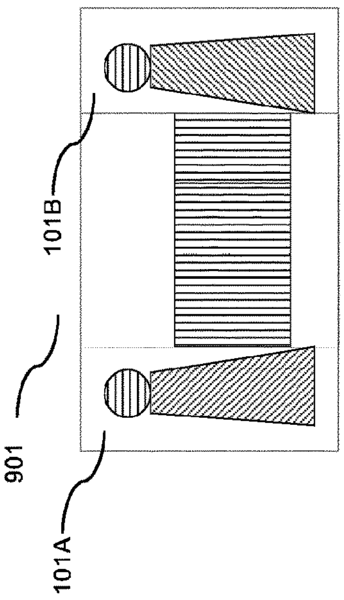

FIG. 9A and FIG. 9B illustrate an example apparatus 901. The apparatus 901 comprises a first light guiding means 101A and a second light guiding means 101B. The apparatus 901 operates on the same principles as apparatus 801. In this example the first light guiding means 101A and the second light guiding means 101B are smaller and the overlap between the first out-coupling diffractive means 107A and the second out-coupling diffractive means 107B is smaller thereby resulting in a smaller combined field-of-view exit pupil compared to the apparatus 801.

Figure 10A:
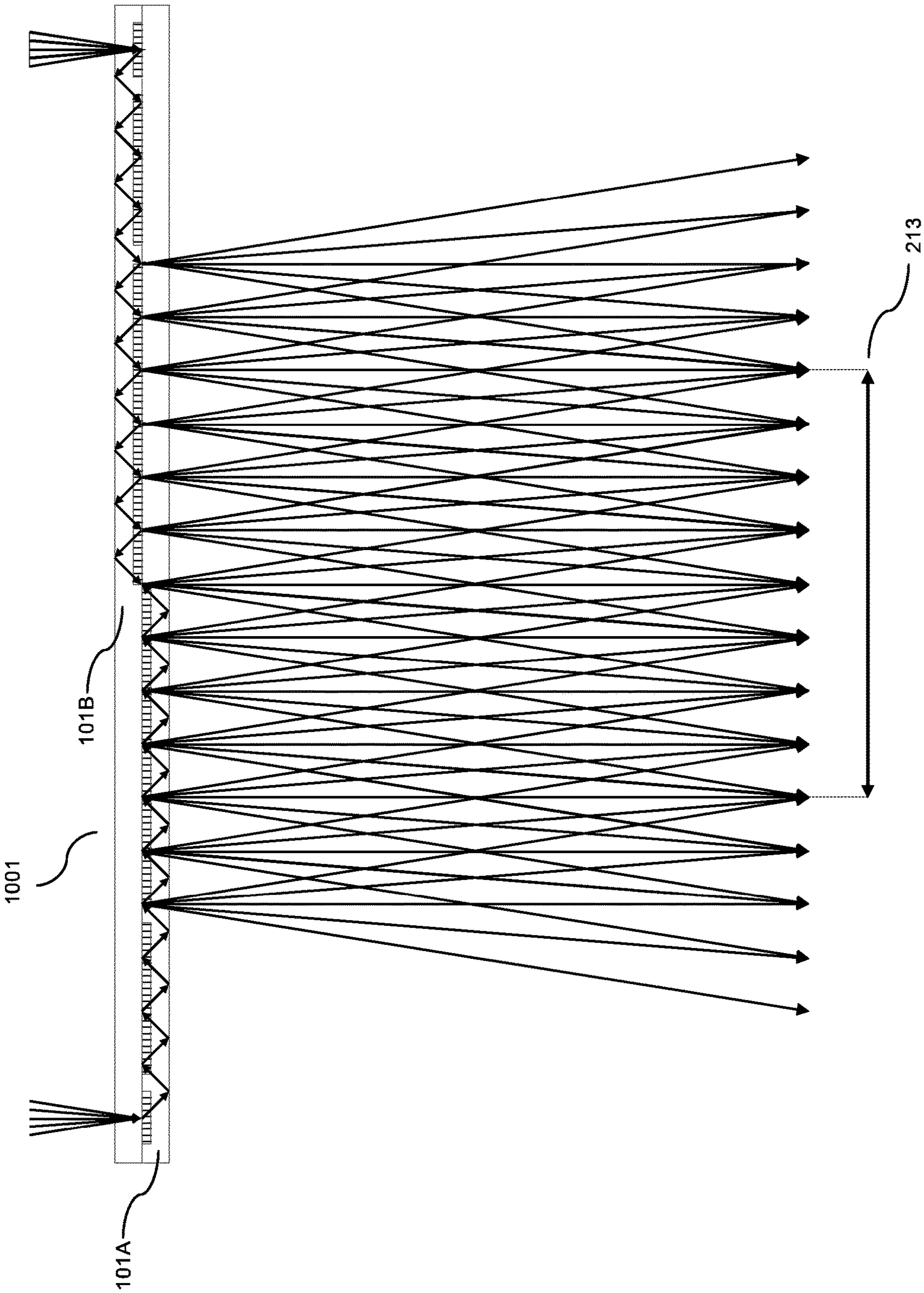
FIG. 10A, 10B, 10C, 10D show example apparatus.

FIG. 10A illustrates an example apparatus 1001 in side view. The apparatus 1001 comprises a first light guiding means 101A and the second light guiding means 101B.

The first out-coupling diffractive means 107A and the second out-coupling diffractive means 107B are positioned to form a combined and continuous out-coupling projected area which is greater in size than either of the individual projected areas of the first out-coupling diffractive means 107A and the second out-coupling diffractive means 107B.

The first out-coupling diffractive means 107A and the second out-coupling diffractive means 107B of the apparatus 201 are positioned so that an edge 206 of the first out-coupling diffractive means 107A is aligned with an edge 208 of the second out-coupling diffractive means 107B to form the combined and continuous out-coupling projected area 203.

The first light guiding means 101A is configured to provide a first image, the second light guiding means 101B is configured to provide a second image. The first image and the second image comprise the same image content. The first light guiding means 101A and the second light guiding means 101B form a combined exit pupil (illustrated by arrow 213).

The combined exit pupil illustrated in FIG. 10A is the combined exit pupil formed at a particular eye relief distance from the first light guiding means 101A.

In at least a part of the combined exit pupil the image viewed is a combination of a portion of the first image and a portion of the second image. The portion of the first image and the portion of the second image that combine to form the viewed image vary depending on the viewing position. In the example of FIG. 10A, the part of the combined exit pupil in which the image viewed is a combination of a portion of the first image and a portion of the second image is the third region, as described below.

In the first region of the combined exit pupil the image viewed is the first image. In a second region of the combined exit pupil the image viewed is the second image. In a third region of the combined exit pupil the image viewed is a combination of a portion of the first image and a portion of the second image. The portion of the first image and the portion of the second image that combine to form the viewed image vary across the third region.

Figure 10C:
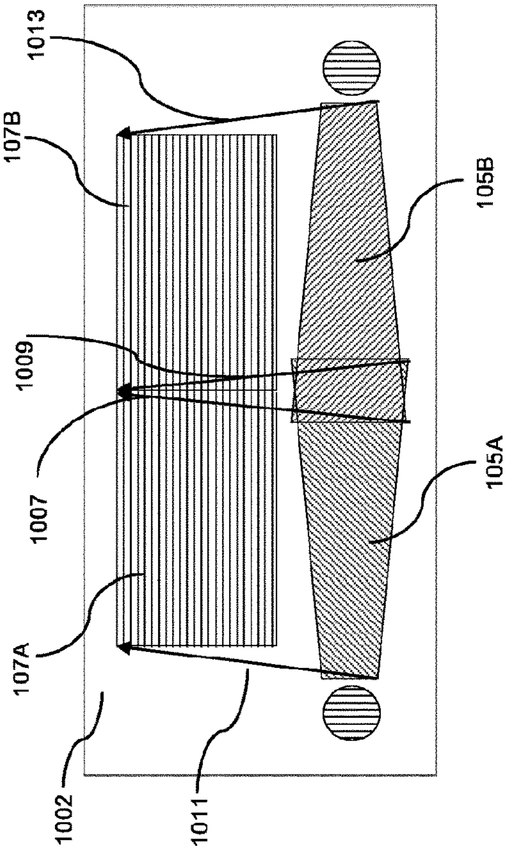
Figure 10B:
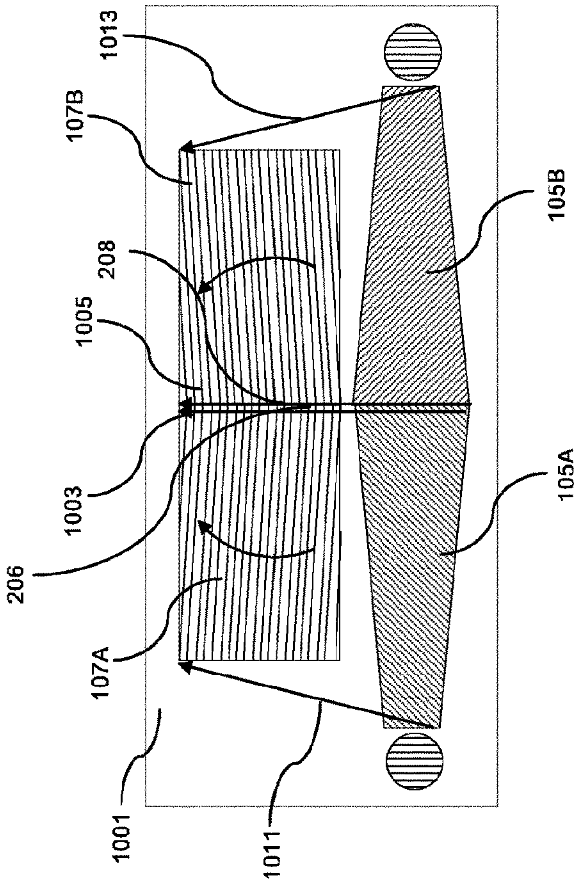

FIG. 10B illustrates the apparatus 1001 in plan view. In this example the first out-coupling diffractive means 107A comprises first diffraction gratings and the second out-coupling diffractive means 107B comprise second diffraction gratings. The first diffraction gratings of the first diffractive out-coupling means 107A are angled away from the edge 206 by a first angle and the second diffraction gratings of the second diffractive out-coupling means 107B are angled away from the edge 208 by a second angle. The first angle and the second angle are the same and are acute. In FIG. 10B the curved arrows illustrate the diffraction gratings being angled compared to horizontal gratings illustrated in FIG. 10C.

FIG. 10C illustrates an example apparatus 1002, which comprises the same components as the apparatus 1001, but the diffraction gratings are horizontal and the positioning of the expanding means 103A, 103B is different. The example apparatus 1002 provides a combined exit pupil as previously described.

Arrow 1007 illustrates a light path from expanding means 105B that travels outside of the second diffractive outcoupling means 107B before arriving at the top corner of the second diffractive out-coupling means 107B. As this beam has not travelled through the second diffractive out-coupling means 107B, the resulting out-coupled beam is brighter than nearby out-coupled beams that resulted from beams travelling through the second out-coupling diffractive means 107B. The same situation occurs for the beam represented by arrow 1009, and the first expanding means 105A and the first diffractive out-coupling means 107A. This leads to bright spots at the top portion of the viewed image, possibly visible only at certain positions within the combined exit pupil. This can lead to interocular differences between the images observed by the left and the right eyes of a user, possibly resulting in problems with visual fusion.

In the apparatus 1001, the angling of the diffraction gratings and the different positioning of the first and second expanding means 105A, 105B results in the light path 1003 from the first expanding means 105A, and the light path 1005 from the second expanding means 105B travelling through their respective diffraction gratings of the first and second diffractive out-coupling means 107A, 107B. This results in the top of the image being at the same brightness as the rest of the image. Light path 1003 is the equivalent light path of 1009 and light path 1005 is the equivalent of light path 1007.

Figure 10D:
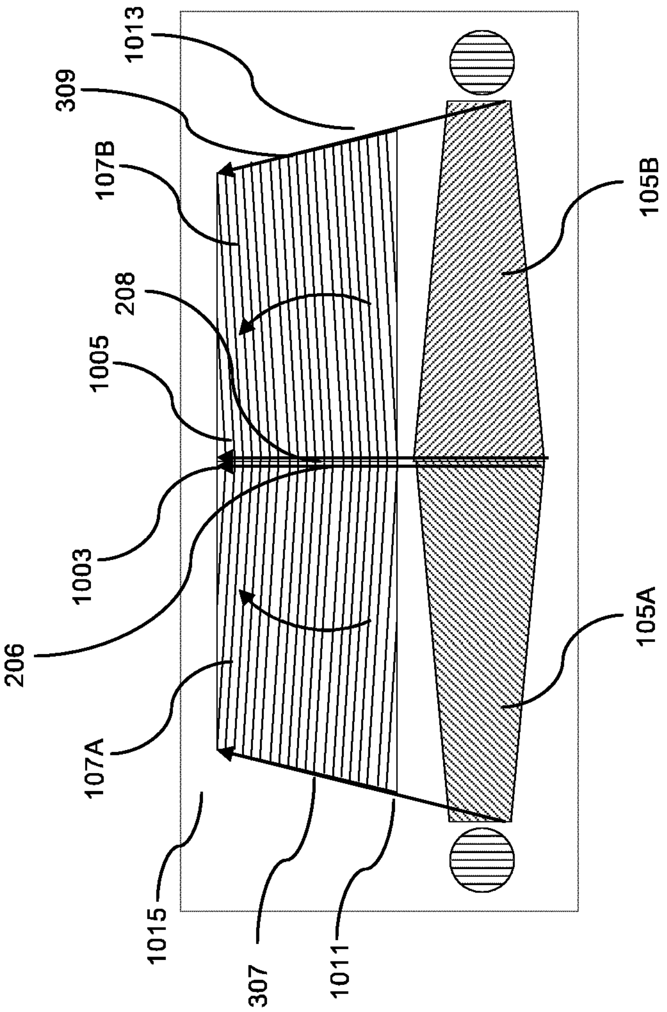

A similar issue of bright spots is possible on the top (i.e. outer) corners of the combined and continuous out-coupling projected area, in both apparatus 1001 and 1002. This is represented by light path 1011 from first expanding means 105A and light path 1013 from second expanding means 105B. This is due to light path 1011 travelling outside of the first diffractive out-coupling means 107A before arriving at the top corner of the first diffractive out-coupling means 107A, and light path 1013 travelling outside of the second diffractive out-coupling means 107B before arriving at the top corner of the second diffractive out-coupling means 107B. FIG. 10D illustrates an example apparatus 1015 which overcomes this issue. In this example, the second edge 307 of the first out-coupling diffractive means 107A is aligned with light path 1011 and the second edge 309 of the second out-coupling diffractive means 107B is aligned with light path 1013. Second edge 307 is nonparallel to edge 206, and second edge 309 is nonparallel to edge 208.

Figure 11B:
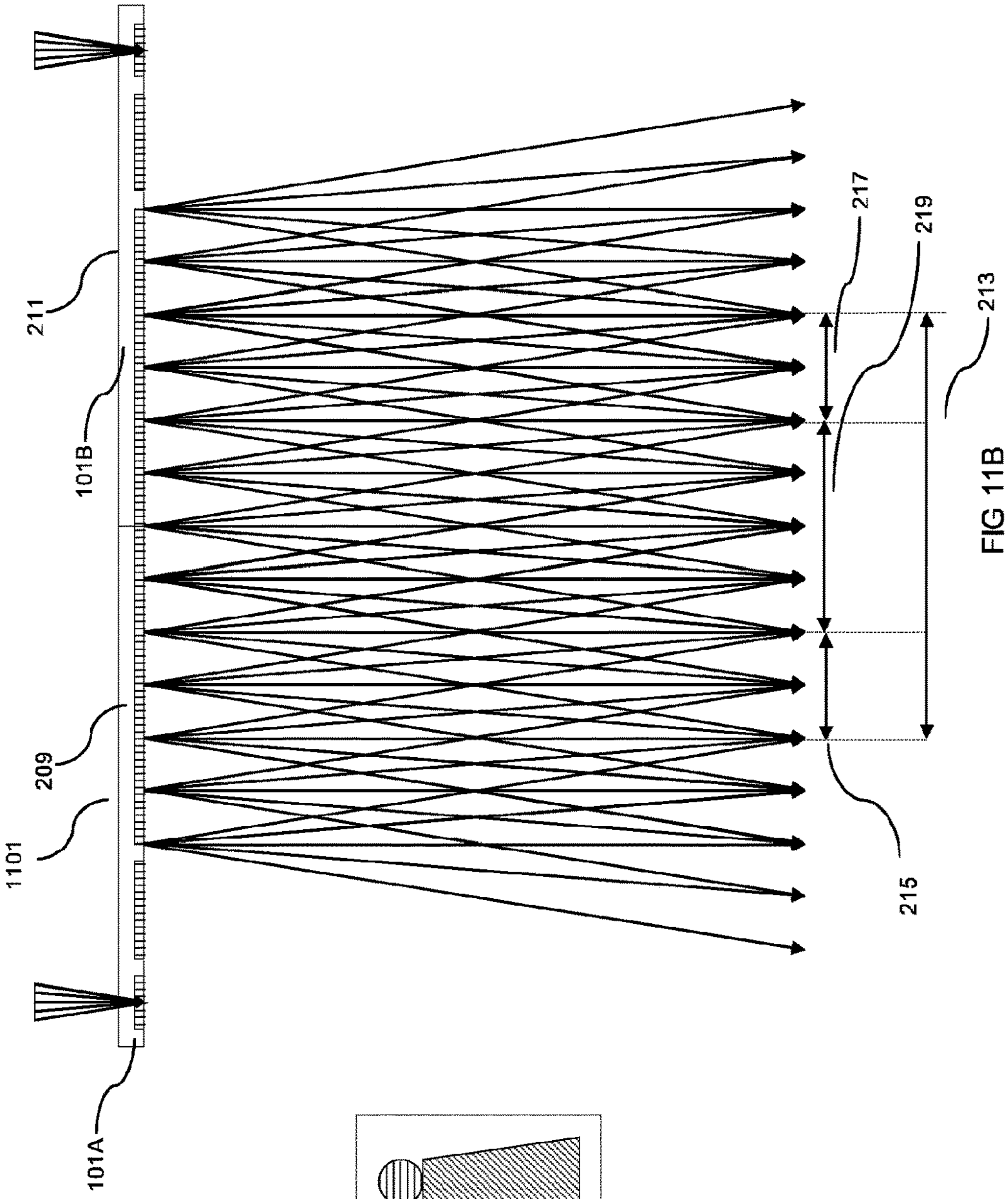
FIG. 11A, 11B show an example apparatus.
Figure 11A:
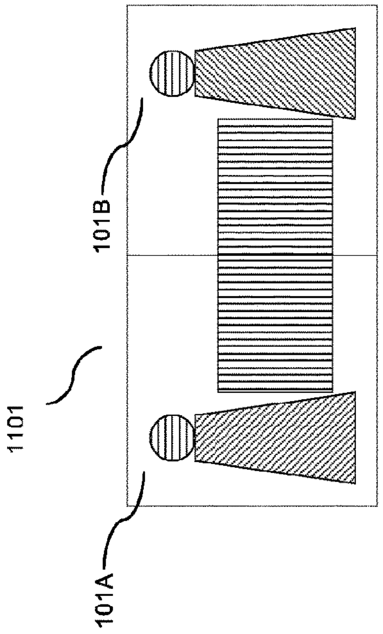

FIG. 11A and FIG. 11B show an example apparatus 1101 in plan view and a side view. The apparatus 1101 comprises a first light guiding means 101A and a second light guiding means 101B.

In this example the apparatus comprises a first substrate 209 and a second substrate 211. The first substrate 209 and the second substrate 211 are arranged so that they abut at their ends.

In some examples, the first out-coupling diffractive means 107A and the second out-coupling diffractive means 107B of apparatus 1101 comprise diffraction gratings. In some examples the spacings of the diffraction gratings is the same for both the first out-coupling diffraction means 107A and the second out-coupling diffraction means 107B of apparatus 1101. In other examples the diffraction spacings are different for the first out-coupling diffractive means 107A and the second out-coupling diffractive means 107B.

In this example the first light guiding means 101A is configured to provide a first image. The second light guiding means 101B is configured to provide a second image. The first image and the second image comprise the same image content. The first light guiding means 101A and the second light guiding means 101B form a combined exit pupil (illustrated by arrow 213).

The combined exit pupil illustrated in FIG. 11B is the combined exit pupil formed at a particular eye relief distance from the first light guiding means 101A.

In at least a part of the combined exit pupil the image viewed is a combination of a portion of the first image and a portion of the second image. The portion of the first image and the portion of the second image that combine to form the viewed image vary depending on the viewing position. In the example of FIG. 11B, the part of the combined exit pupil in which the image viewed is a combination of a portion of the first image and a portion of the second image is the third region, as described below.

In a first region (illustrated by arrow 215) of the combined exit pupil the image viewed is the first image. In the second region (illustrated by arrow 217) the combined exit pupil image viewed is the second image. In a third region (illustrated by arrow 219) of the combined exit pupil the image viewed is a combination of a portion of the first image and a portion of the second image. The portion of the first image and the portion of the second image combine to form the viewed image vary across the third region.

Figure 12A:
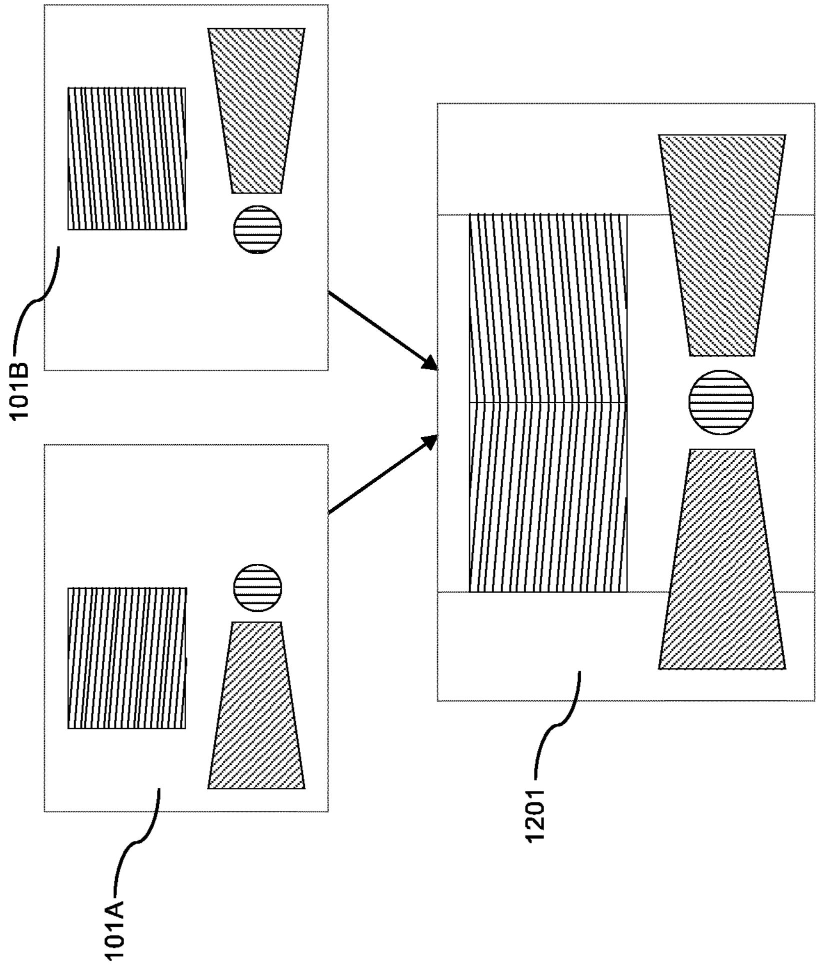
FIG. 12A, 12B show an example apparatus.
Figure 12B:
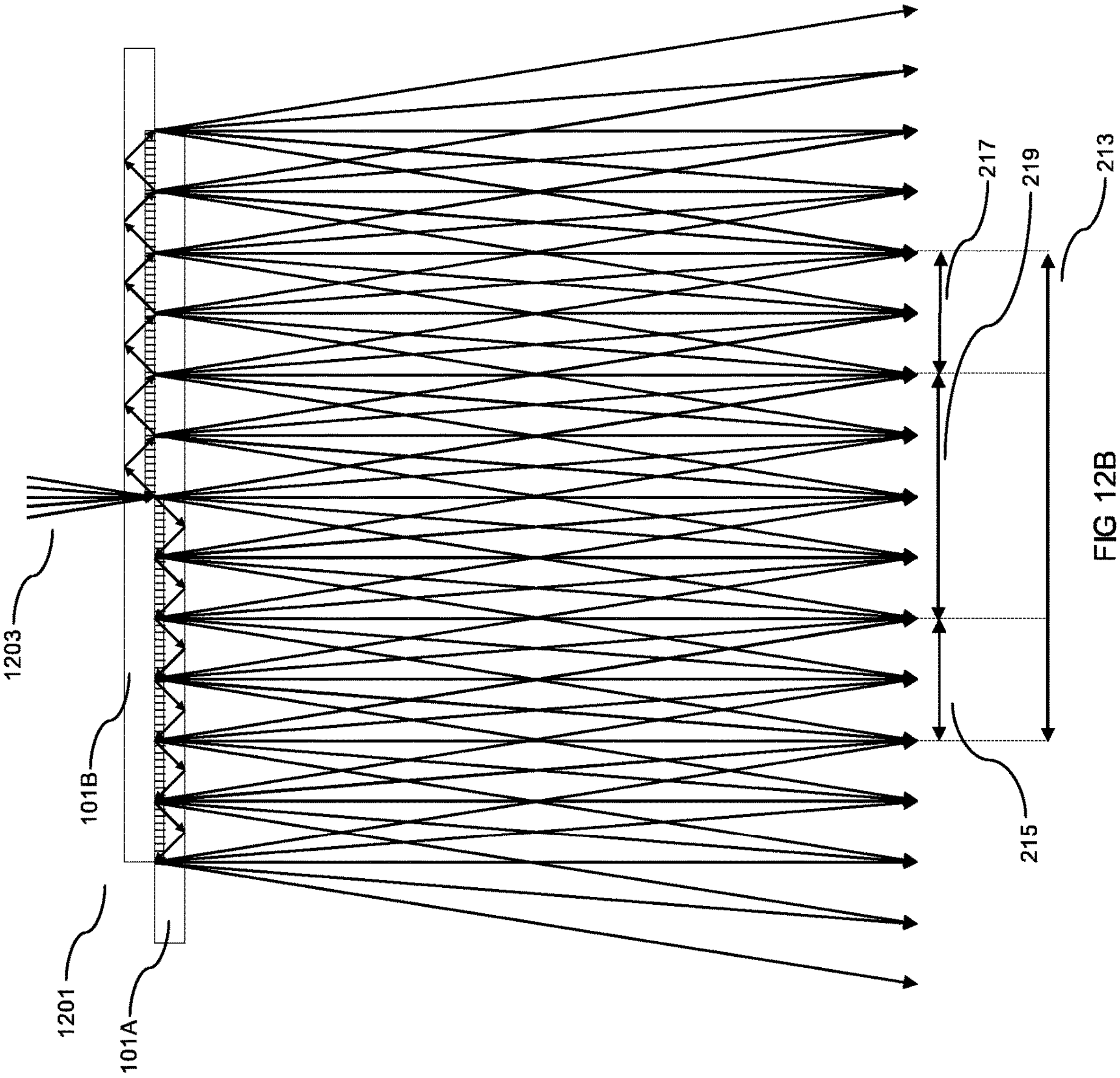

FIG. 12A and FIG. 12B illustrate an example apparatus 1201 in plan view and a side view. In this example the first diffractive in-coupling means 103A and the second diffractive in-coupling means 103B in-couple one or more first input beams of light into the first light guiding means 101A and the second light guiding means 101B from the same light engine. The light paths 1203 illustrate the light coming from the light engine.

In this example the first in-coupling diffractive means 103A and second in-coupling diffractive means 103B are aligned so that they can in-couple light from the same light engine. A significant proportion of the one or more light beams can pass through in-coupling diffractive means without being in-coupled. For example 60% of the light may pass through without being in-coupled. Therefore aligning the two in-coupling diffractive means reduces the amount of light wasted, as the light that is wasted by the second in-coupling diffractive means 103B can be in-coupled by the first in-coupling diffractive means 103A.

In this example the first out-coupling diffractive means 107A and the second out-coupling diffractive means 107B are positioned to form a combined and continuous out-coupling projected area which is greater in size than either of the individual projected areas of the first out-coupling diffractive means 107A and the second out-coupling diffractive means 107B.

The first out-coupling diffractive means 107A and the second out-coupling diffractive means 107B of the apparatus 1201 are positioned so that an edge 206 of the first out-coupling diffractive means 107A is aligned with an edge 208 of the second out-coupling diffractive means 107B to form the combined and continuous out-coupling projected area 203.

In this example the first light guiding means 101A is configured to provide a first image, the second light guiding means 101B is configured to provide a second image. The first image and the second image comprise the same image content, as the light for both the first light guiding means 101A and the second light guiding means 101B originates from the same light engine.

The first light guiding means 101A and the second light guiding means 101B form a combined exit pupil, represented by arrow 213.

The combined exit pupil illustrated in FIG. 12B is the combined exit pupil formed at a particular eye relief distance from the first light guiding means 101A.

In at least a part of the combined exit pupil the image viewed is a combination of a portion of the first image and a portion of the second image. The portion of the first image and the portion of the second image that combine to form the viewed image vary depending on the viewing position. In the example of FIG. 12B, the part of the combined exit pupil in which the image viewed is a combination of a portion of the first image and a portion of the second image is the third region (illustrated by arrow 219), as described below.

In a first region (illustrated by arrow 215) of the combined exit pupil the image viewed is the first image. In the second region (illustrated by arrow 217) of the combined exit pupil, the image viewed is the second image. In a third region 219 of the combined exit pupil the image viewed is a combination of a portion of the first image and a portion of the second image. The portion of the first image and the portion of the second image that combine to form the viewed image vary across the third region.

Figure 13B:
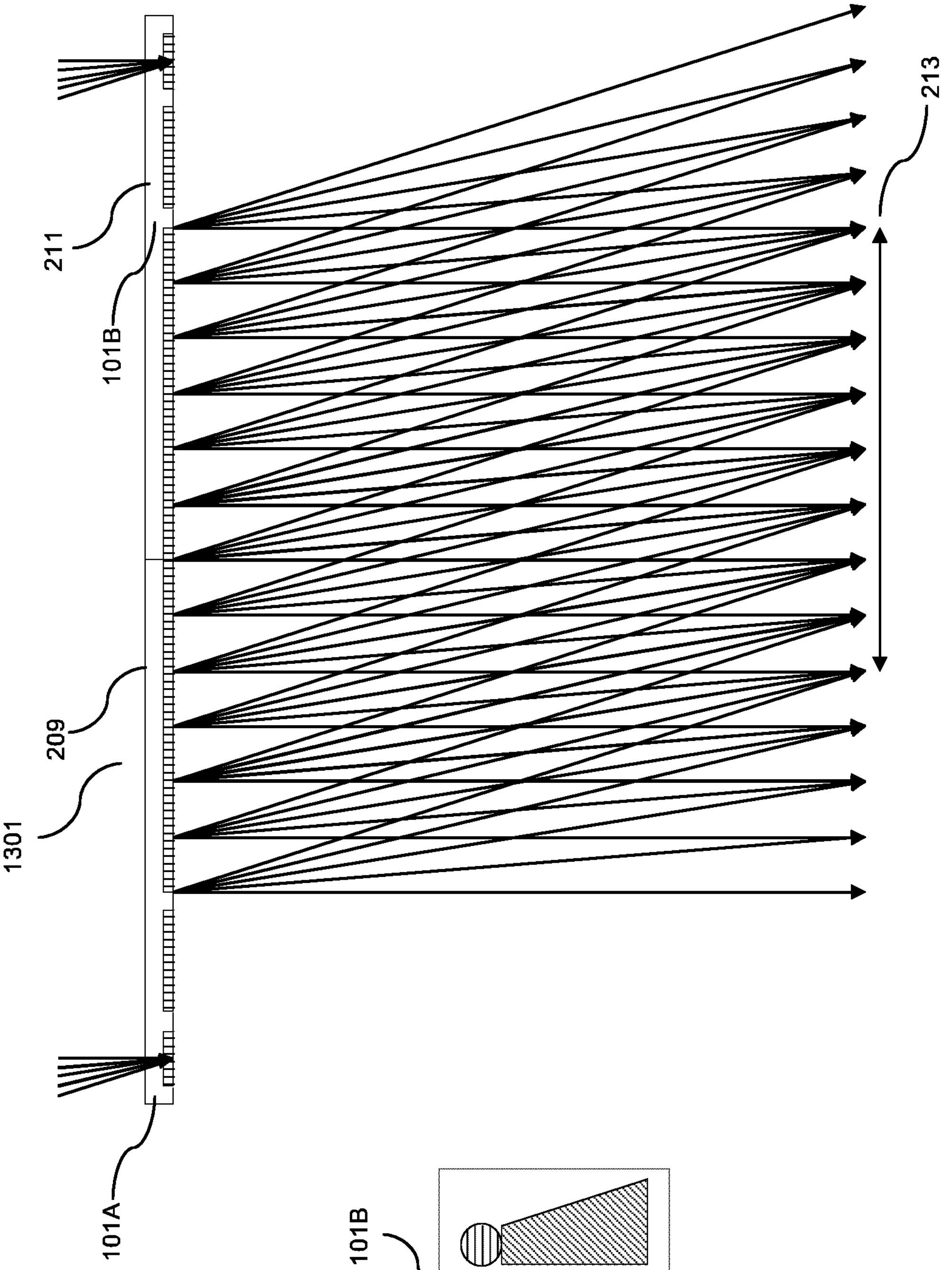
FIG. 13A, 13B show an example apparatus.
Figure 13A:
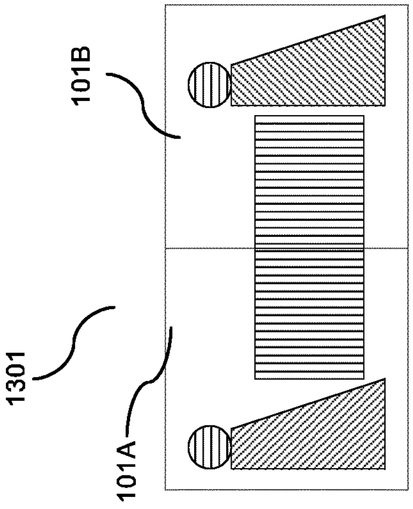
Figure 14B:
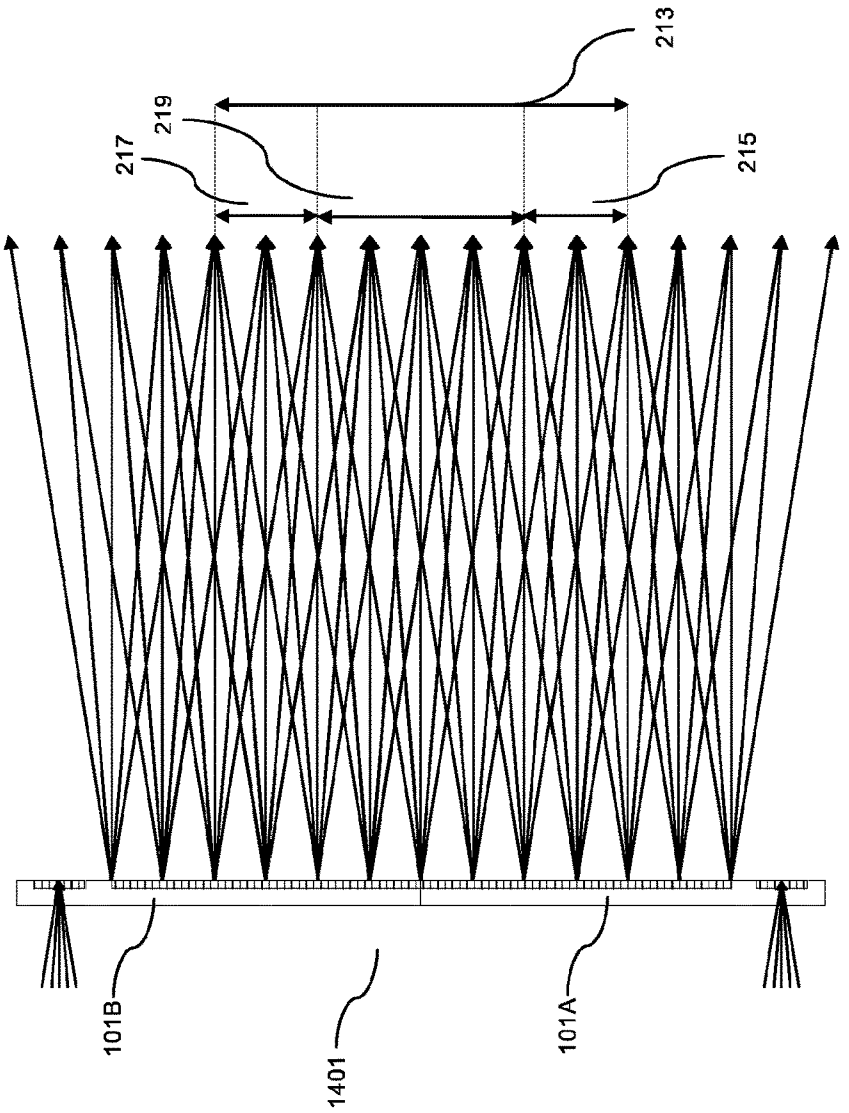
FIG. 14A, 14B show an example apparatus.
Figure 14A:
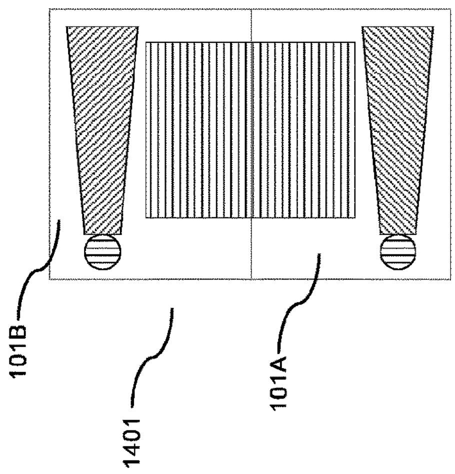
Figure 15B:
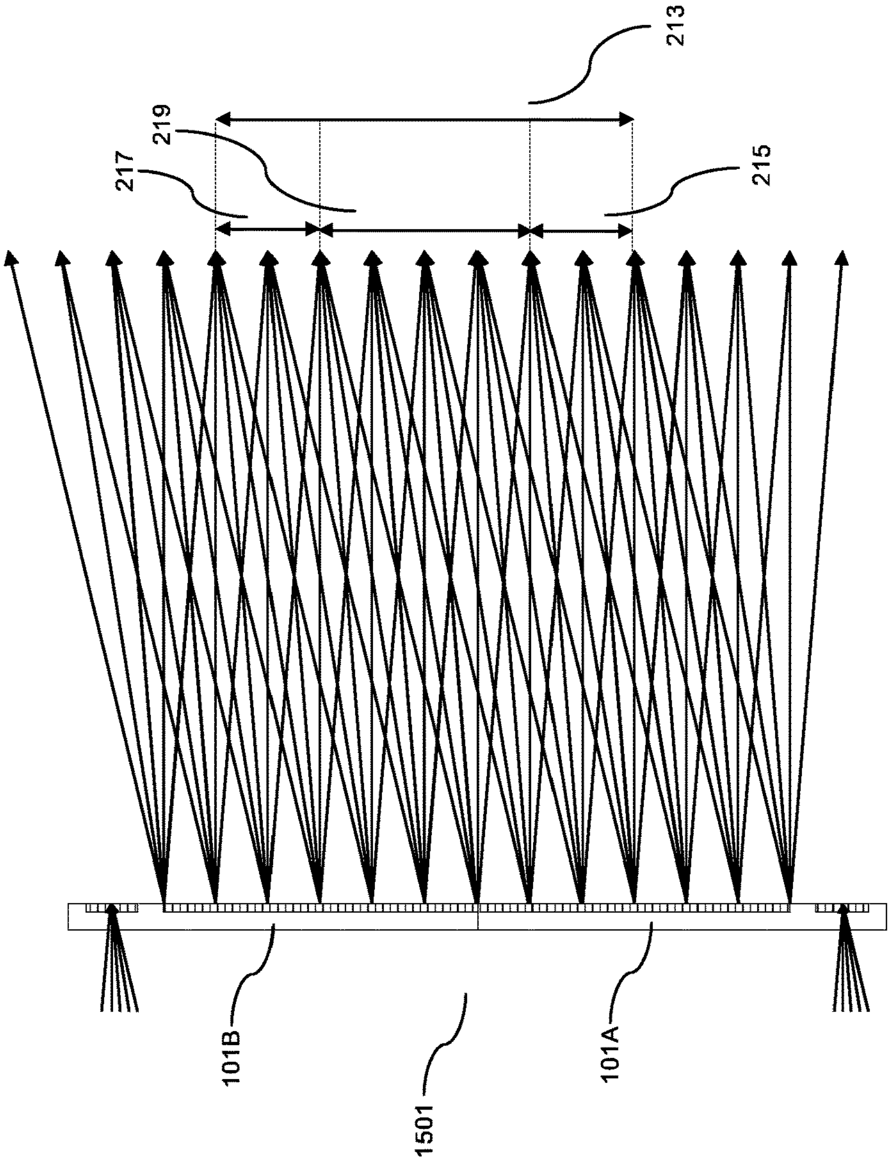
FIG. 15A, 15B show an example apparatus.
Figure 15A:
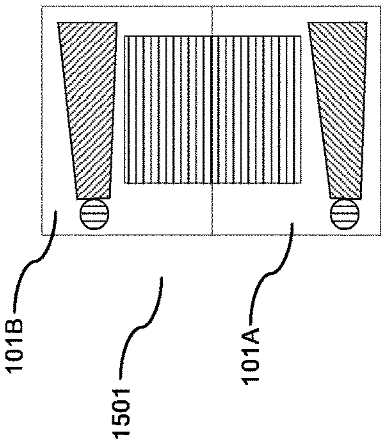

FIG. 13A and FIG. 13B illustrate an example apparatus 1301 in plan view and a side view. In this example the apparatus comprises a first substrate 209 and a second substrate 211. The first substrate 209 and the second substrate 211 are arranged so that they abut at the ends. The apparatus 1301 differs from apparatus 1101 in that it has a tilted field-of-view for the first image and the second image by the same amount and in the same direction to provide a combined exit pupil (illustrated by arrow 213) with a tilted field-of-view.

FIG. 14A, 14B and FIG. 15A, 15B illustrate example apparatus 1401, 1501.

In the example apparatus 1401, 1501, the expanding means 105A, 105B, each have a grating which expands light beams in a horizontal direction.

The first out-coupling diffractive means 107A and the second out-coupling diffractive means 107B are positioned within the first light guiding means 101A and the second light guiding means 101B so that the one or more horizontally expanded beams of light are provided from the first expanding means 105A and the second expanding means 105B to the first out-coupling diffractive means 107A and the second out-coupling diffractive means 107B.

The first out-coupling diffractive means 107A and the second out-coupling diffractive means 107B each have a horizontal grating which expands the horizontally expanded beams of light in the vertical direction.

Any of the example apparatus 201, 301, 401, 501, 601, 701, 801, 901, 1001, 1002, 1101, 1201, 1301 can be provided in the vertical configuration illustrated in FIG. 14A, 14B, 15A, 15B. In the example apparatus 1401, 1501, the first light guiding means 101A and the second light guiding means 101B are abutting at the ends and provide a combined exit pupil (illustrated by arrow 213) as previously described. In example apparatus 1501, the combined exit pupil has a tilted field-of-view.

Figure 16B:
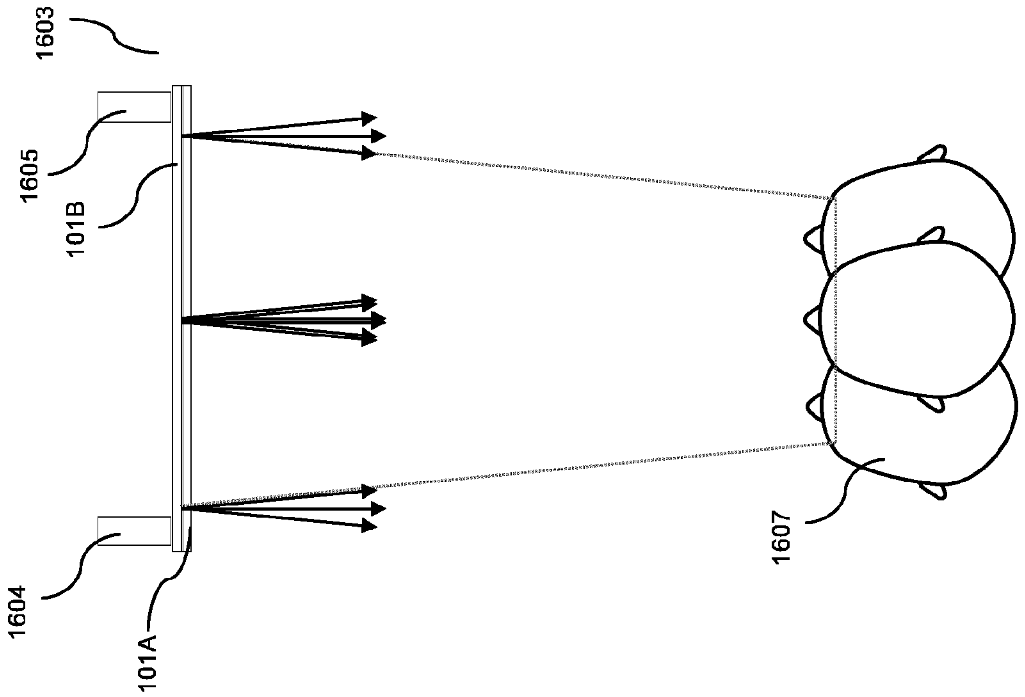
FIG. 16B shows an example head-up display device or module.
Figure 16A:
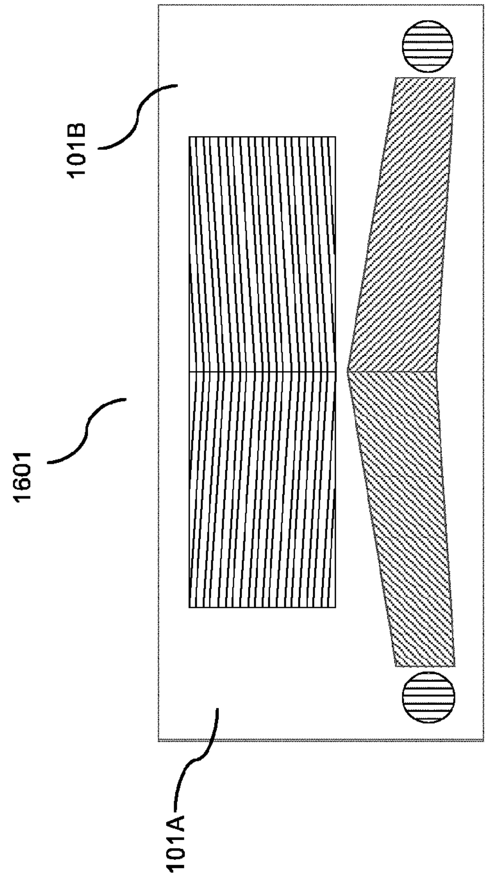
FIG. 16A shows an example apparatus.

FIG. 16A and FIG. 16B illustrate an example heads-up display device or module 1603 comprising an example apparatus 1601. The head-up display device or module 1603 also comprises a first light engine 1604 and a second light engine 1605.

The first out-coupling diffractive means 107A and the second out-coupling diffractive means 107B of the apparatus 1601 are positioned so that an edge 206 of the first out-coupling diffractive means 107A is aligned with an edge 208 of the second out-coupling diffractive means 107B to form a combined and continuous out-coupling projected area 203. In the example apparatus 1601 the first light guiding means 101A is configured to provide a first image, the second light guiding means 101B is configured to provide a second image. The first image and the second image comprise the same image content. The first light guiding means 101A and the second light guiding means 101B form a combined exit pupil. In at least a part of the combined exit pupil the image viewed is a combination of a portion of the first image and a portion of the second image. The portion of the first image and the portion of the second image that combine to form the viewed image vary depending on the viewing position. In the example of FIGS. 16A and 16B, the part of the combined exit pupil in which the image viewed is a combination of a portion of the first image and a portion of the second image is the third region, as described below.

In a first region of the combined exit pupil the image viewed is the first image. In a second region of the combined exit pupil the image viewed is the second image. In a third region of the combined exit pupil the image viewed is a combination of a portion of the first image and a portion of the second image. The portion of the first image and the portion of the second image that combine to form the third image vary across the third region. At certain eye relief distances the first region and the second region do not exist. The image viewed across the entire combined exit pupil at these eye relief distances are a combination of a portion of the first image, and a portion of the second image.

Any of the example apparatus 201, 301, 401, 501, 601, 701, 801, 901, 1001, 1002, 1101, 1201, 1301, 1401, 1501 or other example apparatus described herein can be provided in the head-up display device or module 1603. The example apparatus as described in this application enable a larger (combined) exit pupil that would otherwise need to be provided with a larger, single light guiding means. This is beneficial for head-up display devices where the user of the device desires a large eye relief distance (viewing distance) with a large exit pupil so that they see the field-of-view of the image from the heads-up display across their field of vision. In the context of heads-up display devices, exit pupils are often referred to as eye boxes. FIG. 16B illustrates an eye box where the user 1607 can be positioned differently and still be within the eye box.

Figure 16C:
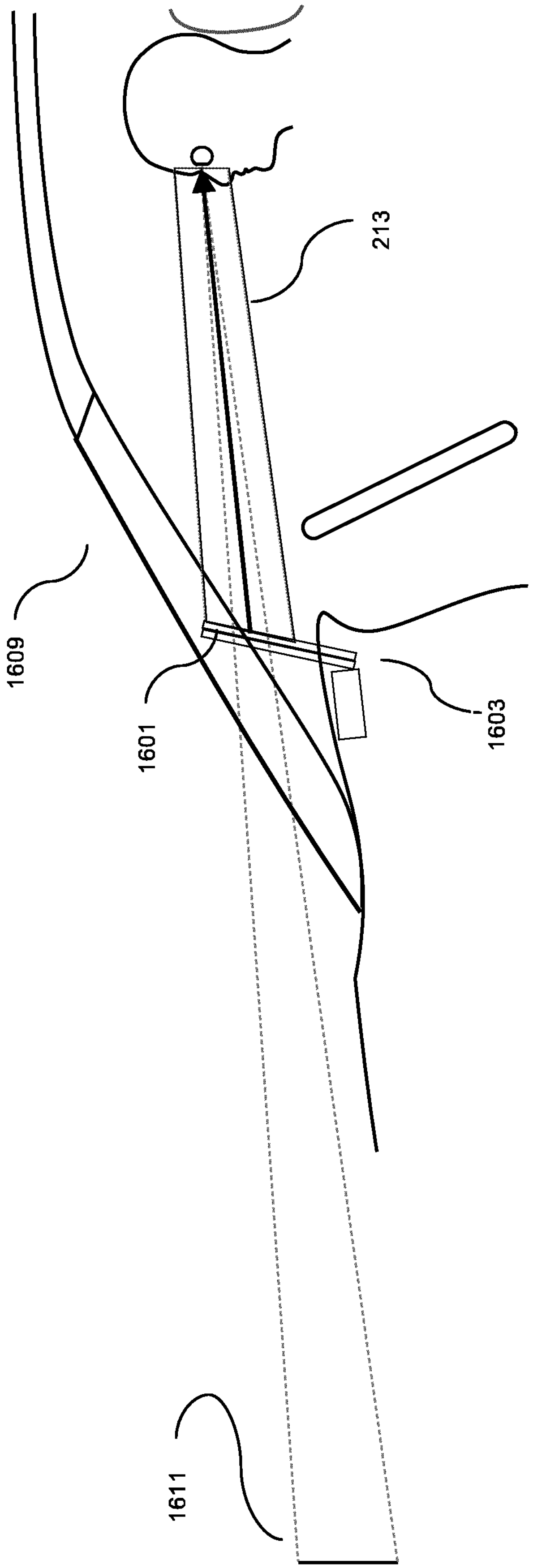
FIG. 16C shows an example vehicle comprising a head-up display or module.

FIG. 16C illustrates an example heads-up display device or module 1603 provided in a vehicle 1609. The vehicle 1609 can comprise a heads-up display device or module 1603 which comprises any example apparatus described herein. In this example, the substrates 209, 211 of the first light guiding means 101A and the second light guiding means 101B are arranged in the line of vision of the user so that the combined exit pupil 113 is provided to the user. The image viewed 1611 can be focused at infinity. In other examples, the heads-up display device or module 1603 is configured to reflect the outcoupled light from the apparatus off the windscreen of the vehicle to reach the user.

In some examples the heads-up display device or module 1603 is configured to reflect the outcoupled light from the apparatus off the windscreen of the vehicle to reach the user. The distortion created by the curved windscreen is compensated in the heads-up display device or module 1603 by compensation means. Examples of these compensation means include: using additional lenses or Fresnel lenses to alter the collimation of the outcoupled light; holographic solutions to alter the collimation of the outcoupled light; or some other compensation means to alter the collimation of the outcoupled light. The outcoupled and compensated light from the apparatus reflects off the windscreen of the vehicle to produce a collimated or focused virtual image reaching the user. The compensation means can be implemented either separately for the first out-coupling diffractive means

107A and the second out-coupling diffractive means 107B or together for the whole combined and continuous out-coupling projected area 203.

The combined exit pupils and combined field-of-view exit pupils described herein may be referred to as multiplexing the exit pupils and/or field-of-views of the individual first light guiding means 101A and the second light guiding means 101B.

The first light guiding means 101A and the second light guiding means 101B can be made using the same master copy for apparatus 201. The first light guiding means 101A and the second light guiding means 101B of apparatus 301, 501, 701, 801, 901, 1001, 1002, 1101, 1201, 1401, 1601 are symmetrical. Other apparatus share common component size and shape for the first light guiding means 101A and the second light guiding means 101B. All of these examples enable easier manufacture.

All the example apparatus are compatible with devices where multiple light guiding means are required for multiplexing colours. In some applications, multiplexing colours is not required. The same applies to multi-focus light guiding means devices, where multiple light guiding means with different radii of curvature are stacked together.

In the example apparatus 201, 301, 401, 1001, 1101, 1201, 1601, the edges 206, 208 are aligned. These example apparatus can be provided without aligning the edges 206, 208 and can still provide a combined exit pupil. Providing that the exit pupils overlap there will be a combined exit pupil, although separation between the images will become more visible the further apart the edges are.

The first substrate 209 and the second substrate 211 can each comprise a waveguide, an optical substrate, a transparent plate or any other suitable material.

The apparatus 501, 601, 701 provide the benefit of better colour uniformity inside the combined field-of-view exit pupil and less light is wasted outside the combined field-of-view exit pupil, compared to apparatus with two light engines that both provide the full field of view.

The apparatus 801, 901 provide the benefit of better colour uniformity inside part of the field of view and less light is wasted outside the combined field-of-view exit pupil, compared to apparatus with two light engines that both provide the full field of view.

For any of the example apparatus, the first out-coupling diffractive means 107A and the second out-coupling diffractive means 107B can comprise diffraction gratings. The diffraction gratings of the first out-coupling diffractive means 107A can have the same spacing as the diffraction gratings of the second out-coupling diffractive means 107B. This can make it easier to manufacture the light guiding means 101A, 101B.

In examples where the field-of-view of the combined exit pupil or the combined field-of-view exit pupil is tilted, the tilting can be provided by tilting the field-of-views of the first light guiding means 101A and the second light guiding means 101B by different amounts. In some examples, one of the field-of-views of the first light guiding means 101A and the second light guiding means is not tilted to provide a tilted field-of-view for the combined exit pupil or the combined field-of-view exit pupil.

In the examples illustrated, where the image content of the first image and the second image comprise the same image content, or comprise portions which have the same image content, this can mean that the image content contains the same high-level features. It can mean that the image content is identical.

Where a structural feature has been described, it may be replaced by means for performing one or more of the functions of the structural feature whether that function or those functions are explicitly or implicitly described.

The term ‘comprise’ is used in this document with an inclusive not an exclusive meaning. That is any reference to X comprising Y indicates that X may comprise only one Y or may comprise more than one Y. If it is intended to use ‘comprise’ with an exclusive meaning then it will be made clear in the context by referring to “comprising only one . . . ” or by using “consisting”.

In this description, reference has been made to various examples. The description of features or functions in relation to an example indicates that those features or functions are present in that example. The use of the term ‘example’ or ‘for example’ or ‘can’ or ‘may’ in the text denotes, whether explicitly stated or not, that such features or functions are present in at least the described example, whether described as an example or not, and that they can be, but are not necessarily, present in some of or all other examples. Thus ‘example’, ‘for example’, ‘can’ or ‘may’ refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term ‘a’ or ‘the’ is used in this document with an inclusive not an exclusive meaning.

That is any reference to X comprising a/the Y indicates that X may comprise only one Y or may comprise more than one Y unless the context clearly indicates the contrary. If it is intended to use ‘a’ or ‘the’ with an exclusive meaning then it will be made clear in the context. In some circumstances the use of ‘at least one’ or ‘one or more’ may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:

a first light waveguide comprising at least: a first in-coupling diffraction grating configured to in-couple one or more first input beams of light into the first light waveguide from a first light engine, a first expander configured to expand the one or more first input beams of light from the first light engine to form one or more first expanded beams of light, and a first out-coupling diffraction grating configured to out-couple the one or more first expanded beams of light from the first light waveguide; and a second light waveguide comprising at least: a second in-coupling diffraction grating configured to in-couple one or more second input beams of light into the second light waveguide from a second light engine, a second expander configured to expand the one or more second input beams of light from the second light engine to form one or more second expanded beams of light, and a second out-coupling diffraction grating configured to out-couple the one or more second expanded beams of light from the second light waveguide;

wherein the first out-coupling diffraction grating and the second out-coupling diffraction grating are positioned to form a combined and continuous out-coupling projected area which is greater in size than either of the individual projected areas of the first out-coupling diffraction grating and the second out-coupling diffraction grating;

wherein the first out-coupling diffraction grating comprises a first part and a second part wherein the first out-coupling diffraction grating and the second out-coupling diffraction grating are positioned so that an edge of the first part is aligned with a first edge of the second out-coupling diffraction grating, and an edge of the second part is aligned with a second edge of the second out-coupling diffraction grating, to form the combined and continuous out-coupling projected area.

2. An apparatus as claimed in claim 1, wherein the first out-coupling diffraction grating and the second out-coupling diffraction grating are positioned so that an edge of the first out-coupling diffraction grating is aligned with an edge of the second out-coupling diffraction grating to form the combined and continuous out-coupling projected area.

3. An apparatus as claimed in claim 2, wherein the first light waveguide is configured to provide a first image, and the second light waveguide is configured to provide a second image, wherein the first image and second image comprise the same image content, wherein the first light waveguide and the second light waveguide form a combined exit pupil, wherein in at least a part of the combined exit pupil the image viewed is a combination of a portion of the first image and a portion of the second image, wherein the portion of the first image and the portion of the second image that combine to form the viewed image vary depending on the viewing position.

4. An apparatus as claimed in claim 1, wherein the first out-coupling diffraction grating and the second out-coupling diffraction grating are positioned so that a portion of the first out-coupling diffraction grating is superposed over a portion of the second out-coupling diffraction grating to form the combined and continuous out-coupling projected area.

5. An apparatus as claimed in claim 4, wherein the first light waveguide is configured to provide a first image, the second light waveguide is configured to provide a second image, wherein the first light waveguide and the second light waveguide form a combined field-of-view exit pupil, wherein in the combined field-of-view exit pupil, the image viewed is a third image, wherein the third image is a combination of the first image and the second image, wherein the third image has a larger field-of-view than the field-of-view of first image or the field-of-view of the second image.

6. An apparatus as claimed in claim 5, wherein the first image and the second image comprise different image content.

7. An apparatus as claimed in claim 5, wherein the first light waveguide and the second light waveguide are arranged so that in the combined field-of-view exit pupil a portion of the first image and a portion of the second image overlap and align, wherein the portion of the first image and the portion of the second image that overlap and align vary across the combined field-of-view exit pupil.

8. An apparatus as claimed in claim 7, wherein the portion of the first image and the portion of the second image are identical image content portions.

9. An apparatus as claimed in claim 8, wherein the portion of the third image where the portion of the first image and the portion of the second image overlap and align is brighter than the rest of the third image.

10. An apparatus as claimed in claim 1, wherein the center of the field-of-view of the first image is not perpendicular to the first outcoupling diffraction grating, and wherein the center of the field-of-view of the second image is not perpendicular to the second out-coupling diffraction grating.

11. An apparatus as claimed in claim 1, wherein the first light waveguide comprises a first substrate, wherein the first substrate comprises the first in-coupling diffraction grating, the first expander, and the first out-coupling diffraction grating, wherein the second light waveguide comprises a second substrate, wherein the second substrate comprises the second in-coupling diffraction grating, the second expander, and the second out-coupling diffraction grating.

12. An apparatus as claimed in claim 11, wherein the first substrate and the second substrate are stacked.

13. An apparatus as claimed in claim 2, wherein the first out-coupling diffraction grating comprises a plurality of first diffraction gratings, wherein the second out-coupling diffraction grating comprises a plurality of second diffraction gratings, wherein the first diffraction gratings are angled away from the edge of the first outcoupling diffraction gratings with a first angle, wherein the second diffraction gratings of the second out-coupling diffraction gratings are angled away from the edge of the second out-coupling diffraction grating with a second angle, wherein the first angle and second angle are the same and are acute.

14. A head-up-display device comprising the apparatus of claim 1.

* * * * *